(12) United States Patent
Shi et al.

(10) Patent No.: US 12,127,257 B2
(45) Date of Patent: Oct. 22, 2024

(54) COMMUNICATION METHOD AND RELATED DEVICE

(71) Applicant: Huawei Technologies Co., Ltd., Shenzhen (CN)

(72) Inventors: Xiaoli Shi, Shanghai (CN); Hongzhuo Zhang, Shanghai (CN); Mingzeng Dai, Shenzhen (CN); Haiyan Luo, Shenzhen (CN); Wenjie Peng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 572 days.

(21) Appl. No.: 17/182,884

(22) Filed: Feb. 23, 2021

(65) Prior Publication Data

US 2021/0185736 A1    Jun. 17, 2021

Related U.S. Application Data

(63) Continuation of application No. PCT/CN2019/101440, filed on Aug. 19, 2019.

(30) Foreign Application Priority Data

Aug. 25, 2018  (CN) .......................... 201810976575.5

(51) Int. Cl.
*H04W 74/00*     (2009.01)
*H04W 24/10*     (2009.01)
*H04W 72/02*     (2009.01)
*H04W 72/044*    (2023.01)
*H04W 74/0833*   (2024.01)

(52) U.S. Cl.
CPC ....... *H04W 74/0833* (2013.01); *H04W 72/02* (2013.01); *H04W 72/046* (2013.01)

(58) Field of Classification Search
None
See application file for complete search history.

(56) References Cited

U.S. PATENT DOCUMENTS 9,210,725 B2 * 12/2015 Kanamarlapudi .... H04W 52/22
9,949,298 B1 *  4/2018 Akoum ................ H04B 7/0695
(Continued)

FOREIGN PATENT DOCUMENTS

CN    102843706 A    12/2012
CN    105830483 A     8/2016
(Continued)

OTHER PUBLICATIONS

Huawei, HiSilicon, "Discussion on beam management aspects for DL MIMO", 3GPP TSG RAN WG1 Meeting #87, R1-1611670, Nov. 14-18, 2016, 7 pages, Reno, USA.
(Continued)

*Primary Examiner* — Ajit Patel
(74) *Attorney, Agent, or Firm* — Slater Matsil, LLP

(57) ABSTRACT

Embodiments of this application provide a communication method and a related device. The method includes: receiving, by a radio access network device, first information sent by a terminal device, where the first information includes an identifier of a beam used by the terminal device for random access and random access information of the terminal device on the beam; and optimizing, by the radio access network device, a random access channel based on the first information.

20 Claims, 6 Drawing Sheets

(56) References Cited

U.S. PATENT DOCUMENTS

| | | | |
|---|---|---|---|
| 10,264,568 B2 | 4/2019 | Zhang et al. | |
| 2014/0348051 A1* | 11/2014 | Park | H04W 74/0866 |
| | | | 370/312 |
| 2018/0020487 A1 | 1/2018 | Tsai et al. | |
| 2018/0048375 A1 | 2/2018 | Guo et al. | |
| 2018/0124837 A1* | 5/2018 | Yu | H04B 7/0695 |
| 2018/0176949 A1* | 6/2018 | Islam | H04B 7/088 |
| 2018/0324863 A1* | 11/2018 | Akoum | H04W 74/006 |
| 2019/0052337 A1* | 2/2019 | Kwon | H04W 74/0833 |
| 2019/0104507 A1* | 4/2019 | Majmundar | H04W 36/0069 |
| 2019/0246290 A1* | 8/2019 | Lee | H04B 7/0695 |
| 2019/0254077 A1* | 8/2019 | Sahlin | H04L 5/0092 |

FOREIGN PATENT DOCUMENTS

| | | |
|---|---|---|
| CN | 106358216 A | 1/2017 |
| CN | 107079502 A | 8/2017 |
| CN | 108023623 A | 5/2018 |
| CN | 108476513 A | 8/2018 |
| WO | 2017146550 A1 | 8/2017 |
| WO | 2017197063 A1 | 11/2017 |
| WO | 2018030845 A1 | 2/2018 |

OTHER PUBLICATIONS

3GPP TS 38.300 V15.2.0 (Jun. 2018), 3rd Generation Partnership Project; Technical Specification Group Radio Access Network; NR; NR and NG-RAN Overall Description; Stage 2 (Release 15), 87 pages.

Nokia, Alcatel-Lucent Shanghai Bell, "NR Random Access Procedure", 3GPP TSG-RAN WG1#88bis, R1-1704943, Apr. 3-7, 2017, 8 pages, Spokane, USA.

3GPP TS 38.331 V15.2.1 (Jun. 2018), 3rd Generation Partnership Project; Technical Specification Group Radio Access Network; NR; Radio Resource Control (RRC) protocol specification (Release 15), 303 pages.

* cited by examiner

COMMUNICATION METHOD AND RELATED DEVICE

CROSS-REFERENCE TO RELATED APPLICATIONS

This application is a continuation of International Application No. PCT/CN2019/101440, filed on Aug. 19, 2019, which claims priority to Chinese Patent Application No. 201810976575.5, filed on Aug. 25, 2018. The disclosures of the aforementioned applications are hereby incorporated herein by reference in their entireties.

TECHNICAL FIELD

This application relates to the field of communications technologies, and more specifically, to a random access communication method and a related device.

BACKGROUND

A random access process is usually a first process that needs to be performed by a terminal device to access a network. Therefore, a configuration parameter used in the random access process has a key impact on random access performance and system performance.

The random access configuration parameter determines a conflict probability of random access. The conflict probability of random access is the key factor that affects a call setup delay, an uplink out-of-synchronization recovery delay, and a handover delay. The conflict probability of random access further affects a call setup success rate and a handover success rate. Inappropriate random access configurations may cause a low preamble detection rate, which results in limited system coverage.

A main function of optimizing a random access configuration parameter of a long term evolution (LTE) mobile communications system may include: optimizing packet random access channel (PRACH) resource configuration, optimizing random access channel (RACH) resource configuration, optimizing random access preamble grouping, and optimizing a random access power control parameter.

A beam and a supplementary uplink carrier exist in 5th generation (5G) communications, and a control unit (CU) and a distributed unit (DU) further exist. A radio access network device may be divided into at least one distributed unit and at least one control unit connected to the at least one distributed unit based on a protocol layer. The distributed unit may include a radio link control (RLC) layer function, a MAC layer function, and a physical (PHY) layer function. The control unit may include a packet data convergence protocol (PDCP) layer function, a service data adaptation protocol (SDAP) layer function, and a radio resource control (RRC) layer function. A network architecture formed by the CU and the DU may be referred to as a CU-DU architecture.

Currently, there is no good mechanism to accurately optimize a random access channel in a timely manner.

SUMMARY

In a random access process, due to interference from a physical uplink shared channel (PUSCH) of a neighboring cell, a change of load (which may include a call arrival rate, an incoming handover rate, and a tracking area update) of a random access channel, a change of load of a PUSCH channel, a change of a network configuration (for example, optimization of an antenna tilt or a change of a transmit power of the cell), and the like, a configuration parameter in a random access process becomes inappropriate. For example, if a terminal device is located at an edge of beam coverage or an edge of uplink carrier coverage, reference signal received power of a beam or an uplink carrier may fluctuate. Consequently, when the terminal device selects a beam, an uplink carrier, or a bandwidth part based on a random access configuration parameter, the terminal device frequently makes random access attempts between different beams, different uplink carriers, or different bandwidth parts.

In view of this, this application provides a random access configuration parameter optimization method. A terminal device measures and records performance of a random access channel, and sends a measurement record report to a radio access network device, so that the radio access network device can accurately optimize a random access configuration parameter in a timely manner based on content of the measurement record report of the terminal device, for example, based on a beam, an uplink carrier, or the like, to improve an access success rate of a system, reduce a delay of a random access process, reduce a quantity of random access attempts, reduce a contention-based access conflict probability, and improve user experience in the random access process of the terminal device.

According to a first aspect, this application provides a communication method. The method may include: A first radio access network device receives first information from a terminal device, where the first information may include an identifier of a beam used by the terminal device for random access and random access information of the terminal device on the beam; and the first radio access network device optimizes a random access channel based on content of the first information. According to this design, an example beneficial effect includes the following: The radio access network device can accurately optimize the random access channel in a timely manner for different beams, to improve an access success rate of a system, reduce a delay of a random access process, reduce a quantity of random access attempts, and reduce a contention-based access conflict probability, thereby improving user experience in a random access process of the terminal device.

With reference to the first aspect, in a feasible design of the first aspect, the identifier of the beam may be an identifier of a synchronization signal block or an identifier of a channel state information reference signal. According to this design, an example beneficial effect includes the following: The radio access network device can identify random access information of different beams, and further accurately optimize a random access channel for a beam in a timely manner by using random access information of the beam that is sent by the terminal device to the radio access network device.

With reference to the first aspect, in a feasible design of the first aspect, the first information may further include a measurement result of the beam, and the measurement result of the beam may include any one or more of the following: an identifier of a cell in which the synchronization signal block is located, a frequency of the synchronization signal block, a signal to interference plus noise ratio of the synchronization signal block, reference signal received power of the synchronization signal block, reference signal received quality of the synchronization signal block, an identifier of a cell in which the channel state information reference signal is located, a frequency of the channel state information reference signal, a signal to interference plus noise ratio of the channel state information reference signal, reference signal received power of the channel state information reference signal, and reference signal received quality of the channel state information reference signal. The identifier of the cell may be a PCI, a CGI, or the like. According to this design, an example beneficial effect includes: The radio access network device can obtain more information about the beam, so as to obtain a more accurate optimization result.

With reference to the first aspect, in a feasible design of the first aspect, before receiving the first information from the terminal device, the first radio access network device may send a request to the terminal device, where the request may be used to request the terminal device to send the first information to the first radio access network device. According to this design, an example beneficial effect includes: Compared with periodically sending the first information to the radio access network device by the terminal device, the terminal device can send the first information to the radio access network device more efficiently.

With reference to the first aspect, in a feasible design of the first aspect, the optimizing, by the first radio access network device, a random access channel based on the first information may include any one or more of the following: optimizing a reference signal received power threshold of the synchronization signal block (SSB), optimizing a reference signal received power threshold of the channel state information reference signal (CSI-RS), and optimizing a random access channel resource. The optimization may be adjustment of a threshold or adjustment of a parameter value. For example, the first radio access network device identifies an SSB in which a preamble used when the terminal device makes a random access attempt is located. If random access frequently fails on an SSB but succeeds on another SSB, an SSB RSRP threshold may be adjusted, to prevent the terminal device from selecting, in a random access process, the SSB on which random access frequently fails, or to enable the terminal device to select, during the first random access, the SSB on which random access frequently succeeds to perform random access. For example, the first radio access network device identifies a CSI-RS in which a preamble used when the terminal device makes a random access attempt is located. If random access frequently fails on a CSI-RS but succeeds on another CSI-RS, a CSI-RS RSRP threshold may be adjusted, to prevent the terminal device from selecting, in a random access process, the CSI-RS on which random access frequently fails, or to enable the terminal device to select, during the first random access, the CSI-RS on which random access frequently succeeds to perform random access. For example, the first radio access network device may properly adjust allocation of the random access channel resource based on content of the first information, so that the random access channel resource occupies a minimum system uplink bandwidth with respect to system load. Alternatively, the first radio access network device may further properly adjust parameters such as initial transmit/receive power and a step of the preamble based on content of the first information, so that the initial transmit/receive power is kept to a minimum when a quantity of random access attempts is relatively small. Alternatively, the first radio access network device may further properly adjust a preamble group based on content of the first information, to reduce a contention-based access conflict probability and reduce a contention handover probability.

According to this design, the radio access network device can optimize any one or more of the RSRP threshold that is of the channel state information reference signal and that is configured by the radio access network device for the terminal device, the RSRP threshold that is of the synchronization signal block and that is configured by the radio access network device for the terminal device, and the random access channel resource. An example beneficial effect includes: The radio access network device can accurately optimize a random access configuration parameter in a timely manner, an access success rate of a system is improved, a delay of a random access process is reduced, a quantity of random access attempts is reduced, a contention-based access conflict probability is reduced, and user experience in a random access process of the terminal device is improved.

With reference to the first aspect, in a feasible design of the first aspect, the method may further include: The first radio access network device sends any one or more pieces of information in the first information to a second radio access network device. The any one or more pieces of information in the first information are used by the second radio access network device to optimize the random access channel based on the any one or more pieces of information. According to this design, an example beneficial effect includes: The second radio access network device is assisted in optimizing a random access channel resource configured by a network side device for the terminal device. In addition, through information exchange between the first radio access network device and the second radio access network device, the two radio access network devices can be flexibly used to optimize a random access channel parameter configured by the network side device for the terminal device, thereby improving an access success rate of a system, reducing a delay of a random access process, reducing a quantity of random access attempts, reducing a contention-based access conflict probability, and improving user experience in a random access process of the terminal device.

With reference to the first aspect, in a feasible design of the first aspect, before sending the any one or more pieces of information in the first information to the second radio access network device, the first radio access network device may receive a request message from the second radio access network device. The request message may be used to request the first radio access network device to send the any one or more pieces of information in the first information to the second radio access network device. According to this design, an example beneficial effect includes: The second radio access network device can flexibly obtain, from the first radio access network device, required information used for random access channel optimization. In addition, compared with periodically sending any one or more pieces of information in the first information to the second radio access network device by the first radio access network device, the terminal device can send any one or more pieces of information in the first information to the radio access network device more efficiently.

With reference to the first aspect, in a feasible design of the first aspect, that the second radio access network device optimizes the random access channel based on the any one or more pieces of information may include: optimizing the random access channel resource. The optimization may be adjustment of a threshold or adjustment of a parameter value. For example, the first radio access network device may properly adjust allocation of the random access channel resource based on content of the first information, so that the random access channel resource occupies a minimum system uplink bandwidth with respect to system load. Alternatively, the first radio access network device may further properly adjust parameters such as initial transmit/receive power and a step of the preamble based on content of the first information, so that the initial transmit/receive power is kept to a minimum when a quantity of random access attempts is relatively small. Alternatively, the first radio access network device may further properly adjust a preamble group based on content of the first information, to reduce a contention-based access conflict probability and reduce a contention handover probability.

According to this design, the second radio access network device can optimize the random access channel resource configured by the network side device for the terminal device. An example beneficial effect includes: The radio access network device can accurately optimize the random access channel resource in a timely manner, an access success rate of a system is improved, a delay of a random access process is reduced, a quantity of random access attempts is reduced, a contention-based access conflict probability is reduced, and user experience in a random access process of the terminal device is improved.

With reference to the first aspect, in a feasible design of the first aspect, the optimizing, by the first radio access network device, a random access channel based on the first information may include: optimizing a reference signal received power threshold of the synchronization signal block, and/or optimizing a reference signal received power threshold of the channel state information reference signal. The optimization may be adjustment of a threshold or adjustment of a parameter value. For example, the first radio access network device identifies an SSB in which a preamble used when the terminal device makes a random access attempt is located. If random access frequently fails on an SSB but succeeds on another SSB, an SSB RSRP threshold may be adjusted, to prevent the terminal device from selecting, in a random access process, the SSB on which random access frequently fails, or to enable the terminal device to select, during the first random access, the SSB on which random access frequently succeeds to perform random access. For example, the first radio access network device identifies a CSI-RS in which a preamble used when the terminal device makes a random access attempt is located. If random access frequently fails on a CSI-RS but succeeds on another CSI-RS, a CSI-RS RSRP threshold may be adjusted, to prevent the terminal device from selecting, in a random access process, the CSI-RS on which random access frequently fails, or to enable the terminal device to select, during the first random access, the CSI-RS on which random access frequently succeeds to perform random access.

According to this design, the radio access network device can optimize the RSRP threshold that is of the channel state information reference signal and that is configured by the radio access network device for the terminal device, and/or the RSRP threshold that is of the synchronization signal block and that is configured by the radio access network device for the terminal device. An example beneficial effect includes: The radio access network device can accurately optimize a random access configuration parameter in a timely manner, an access success rate of a system is improved, a delay of a random access process is reduced, a quantity of random access attempts is reduced, a contention-based access conflict probability is reduced, and user experience in a random access process of the terminal device is improved.

With reference to the first aspect, in a feasible design of the first aspect, the first radio access network device has a radio link control layer function, a medium access control layer function, and a physical layer function, and the second radio access network device has a packet data convergence protocol layer function, a service data adaptation protocol layer function, and a radio resource control layer function. The first radio access network device and the second radio access network device may be components of a base station (gNB), or the first radio access network device and the second radio access network device constitute a base station (gNB). For example, the first radio access network device is a control unit (CU) of the gNB, and the second radio access network device is a distributed unit (DU) of the gNB; or the second radio access network device is a control unit (CU) of the gNB, and the first radio access network device is a distributed unit (DU) of the gNB.

With reference to the first aspect, in a feasible design of the first aspect, the random access information may include any one or more of the following: a quantity of preamble attempt times, preamble information used in a preamble attempt, conflict indication information, load information of the random access channel, load information of a physical uplink shared channel, maximum power arrival indication information, failure duration information, access delay information, path loss estimation information, backoff time information, information about data available for transmission, and a random access type. According to this design, an example beneficial effect includes: The radio access network device can obtain more types of random access information, so as to obtain a more accurate optimization result.

According to a second aspect, this application provides a communication method. The method may include: A first radio access network device receives first information from a terminal device, where the first information may include an identifier of a beam used by the terminal device for random access, random access information of the terminal device on the beam, an identifier of an uplink carrier used by the terminal device for random access, and random access information of the terminal device on the uplink carrier; and the first radio access network device optimizes a random access channel based on the first information. According to this design, an example beneficial effect includes the following: The radio access network device can accurately optimize the random access channel in a timely manner for different beams and different uplink carriers, to improve an access success rate of a system, reduce a delay of a random access process, reduce a quantity of random access attempts, and reduce a contention-based access conflict probability, thereby improving user experience in a random access process of the terminal device.

With reference to the second aspect, in a feasible design of the second aspect, the identifier of the beam may be an identifier of a synchronization signal block or an identifier of a channel state information reference signal. The identifier of the uplink carrier may be an identifier of a normal uplink carrier or an identifier of a supplementary uplink carrier. According to this design, an example beneficial effect includes: The radio access network device can identify random access information of different beams and random access information of different uplink carriers, so as to accurately optimize a random access channel for a beam in a timely manner based on random access information of the beam that is sent by the terminal device to the radio access network device, and accurately optimize a random access channel for an uplink carrier in a timely manner based on random access information of the uplink carrier that is sent by the terminal device to the radio access network device.

With reference to the second aspect, in a feasible design of the second aspect, the first information may further include a measurement result of the beam and a measurement result of the uplink carrier. The measurement result of the beam may include any one or more of the following: an identifier of a cell in which the synchronization signal block is located, a frequency of the synchronization signal block, a signal to interference plus noise ratio of the synchronization signal block, reference signal received power of the synchronization signal block, reference signal received quality of the synchronization signal block, an identifier of a cell in which the channel state information reference signal is located, a frequency of the channel state information reference signal, a signal to interference plus noise ratio of the channel state information reference signal, reference signal received power of the channel state information reference signal, and reference signal received quality of the channel state information reference signal. The measurement result of the uplink carrier includes any one or more of the following: an identifier of a cell in which the normal uplink carrier is located, a frequency of the normal uplink carrier, a signal to interference plus noise ratio of the normal uplink carrier, reference signal received power of the normal uplink carrier, reference signal received quality of the normal uplink carrier, an identifier of a cell in which the supplementary uplink carrier is located, a frequency of the supplementary uplink carrier, a signal to interference plus noise ratio of the supplementary uplink carrier, reference signal received power of the supplementary uplink carrier, and reference signal received quality of the supplementary uplink carrier. The identifier of the cell may be a PCI, a CGI, or the like. According to this design, an example beneficial effect includes: The radio access network device can obtain more information about the beam and the uplink carrier, so as to obtain a more accurate optimization result.

With reference to the second aspect, in a feasible design of the second aspect, before receiving the first information from the terminal device, the first radio access network device may send a request to the terminal device, where the request may be used to request the terminal device to send the first information to the first radio access network device. According to this design, an example beneficial effect includes: Compared with periodically sending the first information to the radio access network device by the terminal device, the terminal device can send the first information to the radio access network device more efficiently.

With reference to the second aspect, in a feasible design of the second aspect, the optimizing, by the first radio access network device, a random access channel based on the first information may include any one or more of the following: optimizing a reference signal received power threshold of the synchronization signal block, optimizing a reference signal received power threshold of the channel state information reference signal, optimizing a reference signal received power threshold of the supplementary uplink carrier, and optimizing a random access channel resource. The optimization may be adjustment of a threshold or adjustment of a parameter value. For example, the first radio access network device identifies an SSB in which a preamble used when the terminal device makes a random access attempt is located. If random access frequently fails on an SSB but succeeds on another SSB, an SSB RSRP threshold may be adjusted, to prevent the terminal device from selecting, in a random access process, the SSB on which random access frequently fails, or to enable the terminal device to select, during the first random access, the SSB on which random access frequently succeeds to perform random access. For example, the first radio access network device identifies a CSI-RS in which a preamble used when the terminal device makes a random access attempt is located. If random access frequently fails on a CSI-RS but succeeds on another CSI-RS, a CSI-RS RSRP threshold may be adjusted, to prevent the terminal device from selecting, in a random access process, the CSI-RS on which random access frequently fails, or to enable the terminal device to select, during the first random access, the CSI-RS on which random access frequently succeeds to perform random access. For example, the first radio access network device identifies an uplink carrier used when the terminal device makes a random access attempt, for example, an UL or an SUL. If random access frequently fails on an uplink carrier, an SUL RSRP threshold may be adjusted, to prevent the terminal device from selecting, in a random access process, the uplink carrier on which random access frequently fails, or to enable the terminal device to select, during the first random access, an uplink carrier on which random access frequently succeeds to perform random access. For example, the first radio access network device may properly adjust allocation of the random access channel resource based on content of the first information, so that the random access channel resource occupies a minimum system uplink bandwidth with respect to system load. Alternatively, the first radio access network device may further properly adjust parameters such as initial transmit/receive power and a step of the preamble based on content of the first information, so that the initial transmit/receive power is kept to a minimum when a quantity of random access attempts is relatively small. Alternatively, the first radio access network device may further properly adjust a preamble group based on content of the first information, to reduce a contention-based access conflict probability and reduce a contention handover probability.

According to this design, the radio access network device can optimize any one or more of the RSRP threshold that is of the channel state information reference signal and that is configured by the radio access network device for the terminal device, the RSRP threshold that is of the synchronization signal block and that is configured by the radio access network device for the terminal device, the RSRP threshold that is of the supplementary uplink carrier and that is configured by the radio access network device for the terminal device, and the random access channel resource. An example beneficial effect includes: The radio access network device can accurately optimize a random access configuration parameter in a timely manner, an access success rate of a system is improved, a delay of a random access process is reduced, a quantity of random access attempts is reduced, a contention-based access conflict probability is reduced, and user experience in a random access process of the terminal device is improved.

With reference to the second aspect, in a feasible design of the second aspect, the method may further include: The first radio access network device sends any one or more pieces of information in the first information to a second radio access network device. The any one or more pieces of information in the first information are used by the second radio access network device to optimize the random access channel based on the any one or more pieces of information. According to this design, an example beneficial effect includes: The second radio access network device is assisted in optimizing a random access channel resource configured by a network side device for the terminal device. In addition, through information exchange between the first radio access network device and the second radio access network device, the two radio access network devices can be flexibly used to optimize a random access channel parameter configured by the network side device for the terminal device, thereby improving an access success rate of a system, reducing a delay of a random access process, reducing a quantity of random access attempts, reducing a contention-based access conflict probability, and improving user experience in a random access process of the terminal device.

With reference to the second aspect, in a feasible design of the second aspect, before sending the any one or more pieces of information in the first information to the second radio access network device, the first radio access network device may receive a request message from the second radio access network device. The request message may be used to request the first radio access network device to send the any one or more pieces of information in the first information to the second radio access network device. According to this design, an example beneficial effect includes: The second radio access network device can flexibly obtain, from the first radio access network device, required information used for random access channel optimization. In addition, compared with periodically sending any one or more pieces of information in the first information to the second radio access network device by the first radio access network device, the terminal device can send any one or more pieces of information in the first information to the radio access network device more efficiently.

With reference to the second aspect, in a feasible design of the second aspect, that the second radio access network device optimizes the random access channel based on the any one or more pieces of information may include: optimizing the random access channel resource. According to this design, the second radio access network device can optimize the random access channel resource configured by the network side device for the terminal device. An example beneficial effect includes: The radio access network device can accurately optimize the random access channel resource in a timely manner, an access success rate of a system is improved, a delay of a random access process is reduced, a quantity of random access attempts is reduced, a contention-based access conflict probability is reduced, and user experience in a random access process of the terminal device is improved.

With reference to the second aspect, in a feasible design of the second aspect, the optimizing, by the first radio access network device, a random access channel based on the first information may include any one or more of the following: optimizing a reference signal received power threshold of the synchronization signal block, optimizing a reference signal received power threshold of the channel state information reference signal, and optimizing a reference signal received power threshold of the supplementary uplink carrier. According to this design, the radio access network device can optimize any one or more of the RSRP threshold that is of the channel state information reference signal and that is configured by the radio access network device for the terminal device, the RSRP threshold that is of the synchronization signal block and that is configured by the radio access network device for the terminal device, and the RSRP threshold that is of the supplementary uplink carrier and that is configured by the radio access network device for the terminal device. An example beneficial effect includes the following: The radio access network device can accurately optimize a random access configuration parameter in a timely manner, to improve an access success rate of a system, reduce a delay of a random access process, reduce a quantity of random access attempts, and reduce a contention-based access conflict probability, thereby improving user experience in a random access process of the terminal device.

With reference to the second aspect, in a feasible design of the second aspect, the first radio access network device has a radio link control layer function, a medium access control layer function, and a physical layer function, and the second radio access network device has a packet data convergence protocol layer function, a service data adaptation protocol layer function, and a radio resource control layer function. The first radio access network device and the second radio access network device may be components of a base station (gNB), or the first radio access network device and the second radio access network device constitute a base station (gNB). For example, the first radio access network device is a control unit (CU) of the gNB, and the second radio access network device is a distributed unit (DU) of the gNB; or the second radio access network device is a control unit (CU) of the gNB, and the first radio access network device is a distributed unit (DU) of the gNB.

With reference to the second aspect, in a feasible design of the second aspect, the random access information may include any one or more of the following: a quantity of preamble attempt times, preamble information used in a preamble attempt, conflict indication information, load information of the random access channel, load information of a physical uplink shared channel, maximum power arrival indication information, failure duration information, access delay information, path loss estimation information, backoff time information, information about data available for transmission, and a random access type. According to this design, an example beneficial effect includes: The radio access network device can obtain more types of random access information, so as to obtain a more accurate optimization result.

According to a third aspect, this application provides a communication method. The method may include: A first radio access network device receives first information from a terminal device, where the first information may include an identifier of an uplink carrier used by the terminal device for random access and random access information of the terminal device on the uplink carrier; and the first radio access network device optimizes a random access channel based on the first information. According to this design, an example beneficial effect includes the following: The radio access network device can accurately optimize the random access channel in a timely manner for different uplink carriers, to improve an access success rate of a system, reduce a delay of a random access process, reduce a quantity of random access attempts, and reduce a contention-based access conflict probability, thereby improving user experience in a random access process of the terminal device.

With reference to the third aspect, in a feasible design of the third aspect, the identifier of the uplink carrier may include either one or both of an identifier of a normal uplink carrier or an identifier of a supplementary carrier. According to this design, an example beneficial effect includes the following: The radio access network device can identify random access information of different uplink carriers, and further accurately optimize a random access channel for an uplink carrier in a timely manner by using random access information of the uplink carrier that is sent by the terminal device to the radio access network device.

With reference to the third aspect, in a feasible design of the third aspect, the first information may further include a measurement result of the uplink carrier, and the measurement result of the uplink carrier may include any one or more of the following: an identifier of a cell in which the normal uplink carrier is located, a frequency of the normal uplink carrier, a signal to interference plus noise ratio of the normal uplink carrier, reference signal received power of the normal uplink carrier, reference signal received quality of the normal uplink carrier, an identifier of a cell in which the supplementary uplink carrier is located, a frequency of the supplementary uplink carrier, a signal to interference plus noise ratio of the supplementary uplink carrier, reference signal received power of the supplementary uplink carrier, and reference signal received quality of the supplementary uplink carrier. The identifier of the cell may be a PCI, a CGI, or the like. According to this design, an example beneficial effect includes: The radio access network device can obtain more information about the uplink carrier, so as to obtain a more accurate optimization result.

With reference to the third aspect, in a feasible design of the third aspect, before receiving the first information from the terminal device, the first radio access network device may send a request to the terminal device, where the request is used to request the terminal device to send the first information to the first radio access network device. According to this design, an example beneficial effect includes: Compared with periodically sending the first information to the radio access network device by the terminal device, the terminal device can send the first information to the radio access network device more efficiently.

With reference to the third aspect, in a feasible design of the third aspect, the optimizing, by the first radio access network device, a random access channel based on the first information may include: optimizing a reference signal received power threshold of the supplementary uplink carrier, and/or optimizing a random access channel resource. According to this design, the radio access network device can optimize the RSRP threshold that is of the supplementary uplink carrier and that is configured by the radio access network device for the terminal device and/or the random access channel resource. An example beneficial effect includes: The radio access network device can accurately optimize the uplink carrier configured for the terminal device and/or the random access channel resource in a timely manner, an access success rate of a system is improved, a delay of a random access process is reduced, a quantity of random access attempts is reduced, a contention-based access conflict probability is reduced, and user experience in a random access process of the terminal device is improved.

With reference to the third aspect, in a feasible design of the third aspect, the method may further include: The first radio access network device sends any one or more pieces of information in the first information to a second radio access network device. The any one or more pieces of information in the first information are used by the second radio access network device to optimize the random access channel based on the any one or more pieces of information. According to this design, an example beneficial effect includes: The second radio access network device is assisted in optimizing a random access channel resource configured by a network side device for the terminal device. In addition, through information exchange between the first radio access network device and the second radio access network device, the two radio access network devices can be flexibly used to optimize a random access channel parameter configured by the network side device for the terminal device, thereby improving an access success rate of a system, reducing a delay of a random access process, reducing a quantity of random access attempts, reducing a contention-based access conflict probability, and improving user experience in a random access process of the terminal device.

With reference to the third aspect, in a feasible design of the third aspect, before sending the any one or more pieces of information in the first information to the second radio access network device, the first radio access network device may receive a request message from the second radio access network device. The request message may be used to request the first radio access network device to send the any one or more pieces of information in the first information to the second radio access network device. According to this design, an example beneficial effect includes: The second radio access network device can flexibly obtain, from the first radio access network device, required information used for random access channel optimization. In addition, compared with periodically sending any one or more pieces of information in the first information to the second radio access network device by the first radio access network device, the terminal device can send any one or more pieces of information in the first information to the radio access network device more efficiently.

With reference to the third aspect, in a feasible design of the third aspect, that the second radio access network device optimizes the random access channel based on the any one or more pieces of information may include: optimizing the random access channel resource. According to this design, the second radio access network device can optimize the random access channel resource configured by the network side device for the terminal device. An example beneficial effect includes: The radio access network device can accurately optimize the random access channel resource in a timely manner, an access success rate of a system is improved, a delay of a random access process is reduced, a quantity of random access attempts is reduced, a contention-based access conflict probability is reduced, and user experience in a random access process of the terminal device is improved.

With reference to the third aspect, in a feasible design of the third aspect, the optimizing, by the first radio access network device, a random access channel based on the first information may include: optimizing a reference signal received power threshold of the supplementary uplink carrier. According to this design, the radio access network device can optimize the RSRP threshold that is of the supplementary uplink and that is configured by the radio access network device for the terminal device. An example beneficial effect includes the following: The radio access network device can accurately optimize a random access configuration parameter in a timely manner, to improve an access success rate of a system, reduce a delay of a random access process, reduce a quantity of random access attempts, and reduce a contention-based access conflict probability, thereby improving user experience in a random access process of the terminal device.

With reference to the third aspect, in a feasible design of the third aspect, the first radio access network device has a radio link control layer function, a medium access control layer function, and a physical layer function, and the second radio access network device has a packet data convergence protocol layer function, a service data adaptation protocol layer function, and a radio resource control layer function. The first radio access network device and the second radio access network device may be components of a base station (gNB), or the first radio access network device and the second radio access network device constitute a base station (gNB). For example, the first radio access network device is a control unit (CU) of the gNB, and the second radio access network device is a distributed unit (DU) of the gNB; or the second radio access network device is a control unit (CU) of the gNB, and the first radio access network device is a distributed unit (DU) of the gNB.

With reference to the third aspect, in a feasible design of the third aspect, the random access information may include any one or more of the following: a quantity of preamble attempt times, preamble information used in a preamble attempt, conflict indication information, load information of the random access channel, load information of a physical uplink shared channel, maximum power arrival indication information, failure duration information, access delay information, path loss estimation information, backoff time information, information about data available for transmission, and a random access type. According to this design, an example beneficial effect includes: The radio access network device can obtain more types of random access information, so as to obtain a more accurate optimization result.

According to a fourth aspect, this application provides a communication method. The method may include: A first radio access network device receives first information from a terminal device, where the first information may include an identifier of a bandwidth part (BWP) used by the terminal device for random access and random access information of the terminal device on the bandwidth part; and the first radio access network device optimizes a random access channel based on the first information. According to this design, an example beneficial effect includes the following: The radio access network device can accurately optimize the random access channel in a timely manner for different bandwidth parts, to improve an access success rate of a system, reduce a delay of a random access process, reduce a quantity of random access attempts, and reduce a contention-based access conflict probability, thereby improving user experience in a random access process of the terminal device.

With reference to the fourth aspect, in a feasible design of the fourth aspect, the first information may further include information about the bandwidth part, and the information about the bandwidth part may include any one or more of the following: a location and bandwidth, a subcarrier spacing, information used by the BWP in an uplink direction, and information used by the BWP in a downlink direction. The information used by the BWP in the uplink or downlink direction may include any one or more of the following: a common configuration, a dedicated configuration, and the like. According to this design, an example beneficial effect includes the following: The radio access network device can identify random access information of different bandwidth parts, and further accurately optimize a random access channel for a bandwidth part in a timely manner by using random access information of the bandwidth part that is sent by the terminal device to the radio access network device.

With reference to the fourth aspect, in a feasible design of the fourth aspect, the first information may further include a measurement result of the bandwidth part, and the measurement result of the bandwidth part may include any one or more of the following: an identifier of a cell in which the bandwidth part is located, a frequency or a frequency band of the bandwidth part, a signal to interference plus noise ratio of the bandwidth part, reference signal received power of the bandwidth part, and reference signal received quality of the bandwidth part. The identifier of the cell may be a PCI, a CGI, or the like. According to this design, an example beneficial effect includes: The radio access network device can obtain more information about the bandwidth part, so as to obtain a more accurate optimization result.

With reference to the fourth aspect, in a feasible design of the fourth aspect, before receiving the first information from the terminal device, the first radio access network device may send a request to the terminal device, where the request is used to request the terminal device to send the first information to the first radio access network device. According to this design, an example beneficial effect includes: Compared with periodically sending the first information to the radio access network device by the terminal device, the terminal device can send the first information to the radio access network device more efficiently.

With reference to the fourth aspect, in a feasible design of the fourth aspect, that the first radio access network device optimizes the random access channel based on the first information may include: optimizing bandwidth part selection, and/or optimizing a random access channel resource. The optimization may be adjustment of a threshold or adjustment of a parameter value. For example, the first radio access network device identifies a BWP on which the terminal device is located when the terminal device makes a random access attempt. If random access frequently fails on a BWP, optimization of bandwidth part selection may be performed, to prevent the terminal device from selecting, in a random access process, the BWP on which random access frequently fails, or to enable the terminal device to choose, during the first random access, to perform random access on a BWP on which random access frequently succeeds. For example, the first radio access network device may properly adjust allocation of the random access channel resource based on content of the first information, so that the random access channel resource occupies a minimum system uplink bandwidth with respect to system load. For example, the first radio access network device may further properly adjust parameters such as initial transmit/receive power and a step of the preamble based on content of the first information, so that the initial transmit/receive power is kept to a minimum when a quantity of random access attempts is relatively small. For example, the first radio access network device may further properly adjust a preamble group based on content of the first information, to reduce a contention-based access conflict probability and reduce a contention handover probability.

According to this design, the radio access network device can optimize the bandwidth part configured by the radio access network device for the terminal device and/or the random access channel resource. An example beneficial effect includes: The radio access network device can accurately optimize the bandwidth part configured for the terminal device and/or the random access channel resource in a timely manner, an access success rate of a system is improved, a delay of a random access process is reduced, a quantity of random access attempts is reduced, a contention-based access conflict probability is reduced, and user experience in a random access process of the terminal device is improved.

With reference to the fourth aspect, in a feasible design of the fourth aspect, the method may further include: The first radio access network device sends any one or more pieces of information in the first information to a second radio access network device. The any one or more pieces of information in the first information are used by the second radio access network device to optimize the random access channel based on the any one or more pieces of information. According to this design, an example beneficial effect includes: The second radio access network device is assisted in optimizing a random access channel resource configured by a network side device for the terminal device. In addition, through information exchange between the first radio access network device and the second radio access network device, the two radio access network devices can be flexibly used to optimize a random access channel parameter configured by the network side device for the terminal device, thereby improving an access success rate of a system, reducing a delay of a random access process, reducing a quantity of random access attempts, reducing a contention-based access conflict probability, and improving user experience in a random access process of the terminal device.

With reference to the fourth aspect, in a feasible design of the fourth aspect, before sending the any one or more pieces of information in the first information to the second radio access network device, the first radio access network device may receive a request message from the second radio access network device. The request message may be used to request the first radio access network device to send the any one or more pieces of information in the first information to the second radio access network device. According to this design, an example beneficial effect includes: The second radio access network device can flexibly obtain, from the first radio access network device, required information used for random access channel optimization. In addition, compared with periodically sending any one or more pieces of information in the first information to the second radio access network device by the first radio access network device, the terminal device can send any one or more pieces of information in the first information to the radio access network device more efficiently.

With reference to the fourth aspect, in a feasible design of the fourth aspect, that the second radio access network device optimizes the random access channel based on the any one or more pieces of information may include: optimizing the random access channel resource. According to this design, the second radio access network device can optimize the random access channel resource configured by the network side device for the terminal device. An example beneficial effect includes: The radio access network device can accurately optimize the random access channel resource in a timely manner, an access success rate of a system is improved, a delay of a random access process is reduced, a quantity of random access attempts is reduced, a contention-based access conflict probability is reduced, and user experience in a random access process of the terminal device is improved.

With reference to the fourth aspect, in a feasible design of the fourth aspect, that the first radio access network device optimizes the random access channel based on the first information may include: optimizing bandwidth part selection. According to this design, the radio access network device can optimize a bandwidth part configured by the radio access network device for the terminal device. An example beneficial effect includes the following: The radio access network device can accurately optimize a random access configuration parameter in a timely manner, to improve an access success rate of a system, reduce a delay of a random access process, reduce a quantity of random access attempts, and reduce a contention-based access conflict probability, thereby improving user experience in a random access process of the terminal device.

With reference to the fourth aspect, in a feasible design of the fourth aspect, the first radio access network device has a radio link control layer function, a medium access control layer function, and a physical layer function, and the second radio access network device has a packet data convergence protocol layer function, a service data adaptation protocol layer function, and a radio resource control layer function. The first radio access network device and the second radio access network device may be components of a base station (gNB), or the first radio access network device and the second radio access network device constitute a base station (gNB). For example, the first radio access network device is a control unit (CU) of the gNB, and the second radio access network device is a distributed unit (DU) of the gNB; or the second radio access network device is a control unit (CU) of the gNB, and the first radio access network device is a distributed unit (DU) of the gNB.

With reference to the fourth aspect, in a feasible design of the fourth aspect, the random access information may include any one or more of the following: a quantity of preamble attempt times, preamble information used in a preamble attempt, conflict indication information, load information of the random access channel, load information of a physical uplink shared channel, maximum power arrival indication information, failure duration information, access delay information, path loss estimation information, backoff time information, information about data available for transmission, and a random access type. According to this design, an example beneficial effect includes: The radio access network device can obtain more types of random access information, so as to obtain a more accurate optimization result.

According to a fifth aspect, this application provides a communication method. The method may include: A second radio access network device receives any one or more pieces of information in first information from a first radio access network device, and the second radio access network device optimizes a random access channel based on the any one or more pieces of information in the first information. For the first information, refer to the first information in the first aspect to the fourth aspect. According to this design, an example beneficial effect includes: The second radio access network device is assisted in optimizing a random access channel resource configured by a network side device for the terminal device. In addition, through information exchange between the first radio access network device and the second radio access network device, the two radio access network devices can be flexibly used to optimize a random access channel parameter configured by the network side device for the terminal device, thereby improving an access success rate of a system, reducing a delay of a random access process, reducing a quantity of random access attempts, reducing a contention-based access conflict probability, and improving user experience in a random access process of the terminal device.

With reference to the fifth aspect, in a feasible design of the fifth aspect, before receiving the any one or more pieces of information in the first information from the first radio access network device, the second radio access network device may send a request to the first radio access network device. The request is used to request the first radio access network device to send the any one or more pieces of information in the first information to the second radio access network device. According to this design, an example beneficial effect includes: The second radio access network device can flexibly obtain, from the first radio access network device, required information used for random access channel optimization. In addition, compared with periodically sending any one or more pieces of information in the first information to the second radio access network device by the first radio access network device, the terminal device can send any one or more pieces of information in the first information to the radio access network device more efficiently.

With reference to the fifth aspect, in a feasible design of the fifth aspect, that the second radio access network device optimizes the random access channel based on the any one or more pieces of information may include: optimizing a random access channel resource. According to this design, the second radio access network device can optimize the random access channel resource configured by the network side device for the terminal device. An example beneficial effect includes: The radio access network device can accurately optimize the random access channel resource in a timely manner, an access success rate of a system is improved, a delay of a random access process is reduced, a quantity of random access attempts is reduced, a contention-based access conflict probability is reduced, and user experience in a random access process of the terminal device is improved.

With reference to the fifth aspect, in a feasible design of the fifth aspect, the first radio access network device has a radio link control layer function, a medium access control layer function, and a physical layer function, and the second radio access network device has a packet data convergence protocol layer function, a service data adaptation protocol layer function, and a radio resource control layer function. The first radio access network device and the second radio access network device may be components of a base station (gNB), or the first radio access network device and the second radio access network device constitute a base station (gNB). For example, the first radio access network device is a control unit (CU) of the gNB, and the second radio access network device is a distributed unit (DU) of the gNB; or the second radio access network device is a control unit (CU) of the gNB, and the first radio access network device is a distributed unit (DU) of the gNB.

According to a sixth aspect, this application provides a first radio access network device. The first radio access network device includes at least one corresponding unit configured to perform a method step, an operation, or a behavior performed by the first radio access network device in any one of the first aspect to the fifth aspect and any implementation of the foregoing aspects. The at least one unit may be disposed in a one-to-one correspondence with the method step, the operation, or the behavior performed by the first radio access network device. These units may be implemented by using a computer program, may be implemented by using a hardware circuit, or may be implemented by using a computer program in combination with a hardware circuit. For example, the first radio access network device may include: an obtaining module, configured to receive first information from a terminal device, where the first information includes an identifier of a beam used by the terminal device for random access and random access information of the terminal device on the beam; and a processing module, configured to optimize a random access channel based on the first information.

With reference to the sixth aspect, in a feasible design of the sixth aspect, the identifier of the beam may be an identifier of a synchronization signal block or an identifier of a channel state information reference signal.

With reference to the sixth aspect, in a feasible design of the sixth aspect, the first information may further include a measurement result of the beam, and the measurement result of the beam may include any one or more of the following: an identifier of a cell in which the synchronization signal block is located, a frequency of the synchronization signal block, a signal to interference plus noise ratio of the synchronization signal block, reference signal received power of the synchronization signal block, reference signal received quality of the synchronization signal block, an identifier of a cell in which the channel state information reference signal is located, a frequency of the channel state information reference signal, a signal to interference plus noise ratio of the channel state information reference signal, reference signal received power of the channel state information reference signal, and reference signal received quality of the channel state information reference signal.

With reference to the sixth aspect, in a feasible design of the sixth aspect, the first information may further include an identifier of an uplink carrier used by the terminal device for the random access and random access information of the terminal device on the uplink carrier.

With reference to the sixth aspect, in a feasible design of the sixth aspect, the identifier of the uplink carrier is an identifier of a normal uplink carrier or an identifier of a supplementary uplink carrier.

With reference to the sixth aspect, in a feasible design of the sixth aspect, the first information may further include a measurement result of the uplink carrier, and the measurement result of the uplink carrier may include any one or more of the following: an identifier of a cell in which the normal uplink carrier is located, a frequency of the normal uplink carrier, a signal to interference plus noise ratio of the normal uplink carrier, reference signal received power of the normal uplink carrier, reference signal received quality of the normal uplink carrier, an identifier of a cell in which the supplementary uplink carrier is located, a frequency of the supplementary uplink carrier, a signal to interference plus noise ratio of the supplementary uplink carrier, reference signal received power of the supplementary uplink carrier, and reference signal received quality of the supplementary uplink carrier.

With reference to the sixth aspect, in a feasible design of the sixth aspect, that the processing module optimizes the random access channel based on the first information may include any one or more of the following: optimizing a reference signal received power threshold of the synchronization signal block, optimizing a reference signal received power threshold of the channel state information reference signal, optimizing a reference signal received power threshold of the supplementary uplink carrier, and optimizing a random access channel resource.

With reference to the sixth aspect, in a feasible design of the sixth aspect, the first radio access network device may further include a sending module, configured to send any one or more pieces of information in the first information to a second radio access network device. The any one or more pieces of information in the first information are used by the second radio access network device to optimize the random access channel based on the any one or more pieces of information in the first information.

With reference to the sixth aspect, in a feasible design of the sixth aspect, that the second radio access network device optimizes the random access channel based on the any one or more pieces of information in the first information may include: optimizing the random access channel resource.

With reference to the sixth aspect, in a feasible design of the sixth aspect, that the processing module optimizes the random access channel based on the first information may include any one or more of the following: optimizing a reference signal received power threshold of the synchronization signal block, optimizing a reference signal received power threshold of the channel state information reference signal, and optimizing a reference signal received power threshold of the supplementary uplink carrier.

With reference to the sixth aspect, in a feasible design of the sixth aspect, the first radio access network device has a radio link control layer function, a medium access control layer function, and a physical layer function, and the second radio access network device has a packet data convergence protocol layer function, a service data adaptation protocol layer function, and a radio resource control layer function. The first radio access network device and the second radio access network device may be components of a base station (gNB), or the first radio access network device and the second radio access network device constitute a base station (gNB). For example, the first radio access network device is a control unit (CU) of the gNB, and the second radio access network device is a distributed unit (DU) of the gNB; or the second radio access network device is a control unit (CU) of the gNB, and the first radio access network device is a distributed unit (DU) of the gNB.

According to a seventh aspect, this application provides a terminal device. The terminal device includes at least one corresponding unit configured to perform a method step, an operation, or a behavior performed by the terminal device in any one of the first aspect to the fifth aspect and any implementation of the foregoing aspects. The at least one unit may be disposed in a one-to-one correspondence with the method step, the operation, or the behavior performed by the terminal device. These units may be implemented by using a computer program, may be implemented by using a hardware circuit, or may be implemented by using a computer program in combination with a hardware circuit. For example, the terminal device may include: a sending module, configured to send first information to a first radio access network device, where the first information may include an identifier of a beam used by the terminal device for random access and random access information of the terminal device on the beam.

With reference to the seventh aspect, in a feasible design of the seventh aspect, the terminal device may further include an obtaining module, configured to receive a random access channel optimization result or information from the radio access network device.

With reference to the seventh aspect, in a feasible design of the seventh aspect, the identifier of the beam may be an identifier of a synchronization signal block or an identifier of a channel state information reference signal.

With reference to the seventh aspect, in a feasible design of the seventh aspect, the first information may further include a measurement result of the beam, and the measurement result of the beam may include any one or more of the following: an identifier of a cell in which the synchronization signal block is located, a frequency of the synchronization signal block, a signal to interference plus noise ratio of the synchronization signal block, reference signal received power of the synchronization signal block, reference signal received quality of the synchronization signal block, an identifier of a cell in which the channel state information reference signal is located, a frequency of the channel state information reference signal, a signal to interference plus noise ratio of the channel state information reference signal, reference signal received power of the channel state information reference signal, and reference signal received quality of the channel state information reference signal.

With reference to the seventh aspect, in a feasible design of the seventh aspect, the first information may further include an identifier of an uplink carrier used by the terminal device for the random access and random access information of the terminal device on the uplink carrier.

With reference to the seventh aspect, in a feasible design of the seventh aspect, the identifier of the uplink carrier is an identifier of a normal uplink carrier or an identifier of a supplementary uplink carrier.

With reference to the seventh aspect, in a feasible design of the seventh aspect, the first information may further include a measurement result of the uplink carrier, and the measurement result of the uplink carrier may include any one or more of the following: an identifier of a cell in which the normal uplink carrier is located, a frequency of the normal uplink carrier, a signal to interference plus noise ratio of the normal uplink carrier, reference signal received power of the normal uplink carrier, reference signal received quality of the normal uplink carrier, an identifier of a cell in which the supplementary uplink carrier is located, a frequency of the supplementary uplink carrier, a signal to interference plus noise ratio of the supplementary uplink carrier, reference signal received power of the supplementary uplink carrier, and reference signal received quality of the supplementary uplink carrier.

With reference to the seventh aspect, in a feasible design of the seventh aspect, the random access information may include any one or more of the following: a quantity of preamble attempt times, preamble information used in a preamble attempt, conflict indication information, load information of the random access channel, load information of a physical uplink shared channel, maximum power arrival indication information, failure duration information, access delay information, path loss estimation information, backoff time information, information about data available for transmission, and a random access type.

According to an eighth aspect, this application provides a second radio access network device. The second radio access network device includes at least one corresponding unit configured to perform a method step, an operation, or a behavior performed by the second radio access network device in any one of the first aspect to the fifth aspect and any implementation of the foregoing aspects. The at least one unit may be disposed in a one-to-one correspondence with the method step, the operation, or the behavior performed by the second radio access network device. These units may be implemented by using a computer program, may be implemented by using a hardware circuit, or may be implemented by using a computer program in combination with a hardware circuit. For example, the second radio access network device may include: an obtaining module, configured to receive any one or more pieces of information in first information from a first radio access network device, where for the first information, refer to the first information in the first aspect to the fourth aspect; and a processing module, configured to optimize a random access channel based on the any one or more pieces of information in the first information.

With reference to the eighth aspect, in a feasible design of the eighth aspect, the second radio access network device may further include a sending module, configured to send a request to the first radio access network device, where the request is used to request the first radio access network device to send the any one or more pieces of information in the first information to the second radio access network device.

With reference to the eighth aspect, in a feasible design of the eighth aspect, that the processing module optimizes the random access channel based on the any one or more pieces of information in the first information may include: optimizing a random access channel resource.

With reference to the eighth aspect, in a feasible design of the eighth aspect, the first radio access network device has a radio link control layer function, a medium access control layer function, and a physical layer function, and the second radio access network device has a packet data convergence protocol layer function, a service data adaptation protocol layer function, and a radio resource control layer function. The first radio access network device and the second radio access network device may be components of a base station (gNB), or the first radio access network device and the second radio access network device constitute a base station (gNB). For example, the first radio access network device is a control unit (CU) of the gNB, and the second radio access network device is a distributed unit (DU) of the gNB; or the second radio access network device is a control unit (CU) of the gNB, and the first radio access network device is a distributed unit (DU) of the gNB.

According to a ninth aspect, this application provides a communications apparatus. The communications apparatus may include at least one processor, and a related program instruction is executed by the at least one processor, to implement a function of the terminal device, the first radio access network device, or the second radio access network device in the method according to any one of the first aspect to the fifth aspect and any design of the foregoing aspects. Optionally, the communications apparatus may further include at least one memory, and the memory stores the related program instruction. The communications apparatus may be the terminal device, the first radio access network device, or the second radio access network device in the method according to any one of the first aspect to the fifth aspect and any design of the foregoing aspects.

According to a tenth aspect, this application provides a system chip. The system chip may be applied to a communications apparatus. The system chip includes at least one processor, and a related program instruction is executed by the at least one processor, to implement a function of the terminal device, the first radio access network device, or the second radio access network device in the method according to any one of the first aspect to the fifth aspect and any design of the foregoing aspects. Optionally, the system chip may further include at least one memory, and the memory stores the related program instruction.

According to an eleventh aspect, this application provides a computer readable storage medium. The computer readable storage medium may be applied to a communications apparatus. The computer readable storage medium stores a program instruction, and the related program instruction is run, to implement a function of the terminal device, the first radio access network device, or the second radio access network device in the method according to any one of the first aspect to the fifth aspect and any design of the foregoing aspects.

According to a twelfth aspect, this application provides a computer program product. The computer program product includes a program instruction, and the related program instruction is executed, to implement a function of the terminal device, the first radio access network device, or the second radio access network device in the method according to any one of the first aspect to the fifth aspect and any design of the foregoing aspects.

According to a thirteenth aspect, this application provides a communications system. The system may include any one or more of the following: the terminal device in the sixth aspect, the first radio access network device in the seventh aspect, the second radio access network device in the eighth aspect, the communications apparatus in the ninth aspect, the system chip in the tenth aspect, the computer readable storage medium in the eleventh aspect, or the computer program product in the twelfth aspect.

BRIEF DESCRIPTION OF THE DRAWINGS

The accompanying drawings, which are included in this specification and constitute a part of this specification, together with this specification show example embodiments, or features and aspects of this application, and are used to explain principles of this application. It is clear that the accompanying drawings in the following descriptions merely show some embodiments of this application, and a person of ordinary skill in the art may further derive other drawings from these accompanying drawings without creative efforts.

DETAILED DESCRIPTION OF ILLUSTRATIVE EMBODIMENTS

Figure 1:
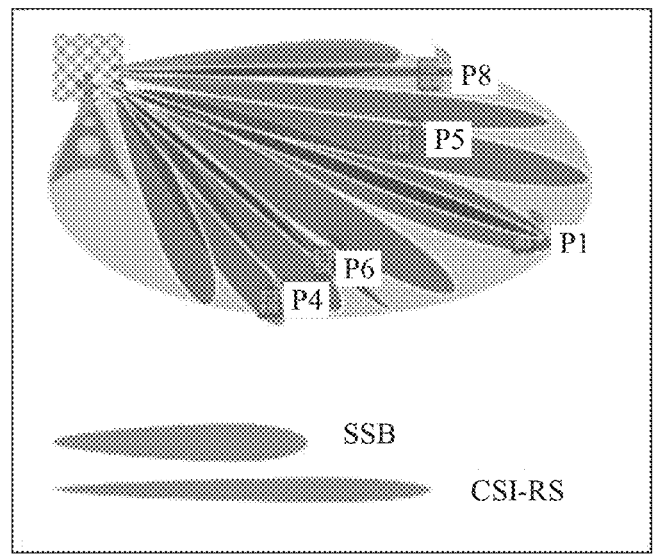
FIG. 1 is a schematic diagram of a possible beam form of a communications system according to an embodiment of this application.

The following describes technical solutions of this application with reference to the accompanying drawings.

In the descriptions of this application, terms such as "first" and "second" are merely used for distinction and description, and should not be understood as an indication or implication of relative importance, or as an indication or implication of an order. Numbers of information such as "first information" and "second information" with different numbers in this application are merely used for contextual convenience, and different sequence numbers do not have specific technical meanings. For example, first information or second information may be understood as one or any one of a series of pieces of information. A function of the numbered information, for example, may be determined based on context content of the numbered information and/or a function of information carried in the numbered information. It may be understood that, during specific implementation, information with different numbers may be same information or a same type of information, and the information with different numbers may be carried in a same message or a same type of message, or the information with different numbers may be a same message or a same type of message. This is not limited in this application.

The term "and/or" in this application describes only association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

For example, a feature or content marked by a dashed line in the figures in the embodiments of this application is an optional operation or an optional structure in the embodiments.

In this application, the terms "include", "have" and any other variants are intended to cover the non-exclusive inclusion, for example, a process, method, system, product, or device that includes a list of steps or units is not necessarily limited to those steps or units that are clearly listed, but may include other steps or units not expressly listed or inherent to such a process, method, product, or device.

The technical solutions in the embodiments of this application may be used in various communications systems, for example, a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a new radio (NR) system in a 5th generation (5G) mobile communications system, and another network system that may be used to provide a mobile communication service. This is not limited herein.

In this application, for example, a related terminal device is generally a device that has a capability of communicating with a network side device, for example, may be user equipment (UE), an access terminal device, a user unit, a user station, a mobile station, a mobile console, a remote station, a remote terminal device, a mobile device, a user terminal device, a terminal device, a wireless terminal device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile communications network (PLMN), a vehicle device in the Internet of Vehicles, or the like. In the embodiments of this application, a specific implementation form of the terminal device is not limited.

In this application, a radio access network device is generally, for example, a device that may be configured to communicate with the terminal device. The radio access network device may be a base transceiver station (BTS) in a global system for mobile communications (GSM) system or a code division multiple access (CDMA) system, or may be a NodeB (NB) in a wideband code division multiple access (WCDMA) system, or may be an evolved NodeB (eNB or eNodeB) in an LTE system, or may be a radio controller in a scenario of a cloud radio access network (CRAN). Alternatively, the radio access network device may be a relay node, an access point, a vehicle-mounted device, a wearable device, a radio access network device, such as an NR nodeB, a gNB or gNodeB, a control unit (CU), or a distributed unit (DU), in a future 5G network, a radio access network device in a future evolved PLMN network, or the like. A specific implementation form of the radio access network device is not limited in the embodiments of this application.

For example, the radio access network device may configure the terminal device by using a broadcast signal, radio resource control (RRC) signaling, a medium access control element (MAC CE), downlink control information (DCI), and the like. In this application, information exchanged between radio access network devices may be transferred through an X2 interface or an Xn interface or by using inter-node RRC information in RRC signaling.

For example, features or content marked by dashed lines in the accompanying drawings in the embodiments of this application may be understood as optional operations or optional structures of the embodiments.

FIG. 1 is a schematic diagram of a possible beam form of a communications system according to this application. The following specifically describes the technical solutions in the embodiments of this application with reference to FIG. 1.

For example, the beam form of the communications system shown in FIG. 1 may include a radio access network device and a plurality of terminal devices, for example, terminal devices P1, P4, P5, P6 and P8. The radio access network device forms beams in space, and the beams may include an SSB beam and a CSI-RS beam shown in FIG. 1. For example, forms of the synchronization signal block (SSB) beam and the channel state information reference signal (CSI-RS) beam may be shown in FIG. 1. Generally, the CSI-RS beam is for a terminal device that has established a connection to a network, for example, the terminal devices P1 and P6 in FIG. 1, and the SSB beam is for a terminal device that has not established a connection to a network, for example, the terminal devices P4, P5, and P8 in FIG. 1.

For example, in this application, beams may be referred to as an SSB beam and a CSI-RS beam based on different beam identification information. The beam may be understood as a spatial time-frequency resource identified by using identification information. For example, the identification information may correspond to a resource identifier (ID) configured by the radio access network device for the terminal device. For example, the identification information may correspond to an ID or a resource of a CSI-RS configured by the radio access network device for the terminal device. Alternatively, for example, the identification information may be identification information explicitly or implicitly carried by using a signal or a channel carried by a beam. For example, the identification information may be identification information that is of the beam and that is indicated by using a synchronization signal or a broadcast channel sent by using the beam, or the identification information may be identification information that is of the beam and that is indicated by using an SSB sent by using the beam. The SSB may include any one or more of a primary synchronization signal (PSS), a secondary synchronization signal (SSS), and a broadcast channel (PBCH).

A beam is introduced into a 5th generation (5G) mobile communications system or a new radio (NR) mobile communications system. Generally, the radio access network device may configure an SSB-based reference signal received power (RSRP) threshold (for example, rsrpthresholdSSB) for the terminal device; likewise, the radio access network device may configure a CSI-RS-based reference signal received power threshold (for example, rsrpthresholdCSI-RS) for the terminal device. The threshold may be configured by the radio access network device for the terminal device by using radio resource control (RRC) signaling. For example, SSB-related resources and threshold information may be sent to the terminal device by using broadcast information, and CSI-RS-related resources and threshold information may be configured for the terminal device by using dedicated signaling. For example, the CSI-RS is usually used for random access in a contention free scenario. Generally, the terminal device may select a beam based on the rsrpthresholdSSB and the rsrpthresholdCSI-RS, to select a configuration resource of the beam to perform random access. For example, after the terminal device measures SSB reference signal received power (SSB-RSRP), the terminal device usually selects a preamble in any SSB whose SSB-RSRP signal quality exceeds the rsrpthresholdSSB, to perform random access. For another example, after the terminal device measures CSI-RS reference signal received power (CSI-RSRP), the terminal device usually selects a preamble in any CSI-RS whose CSI-RSRP signal quality exceeds the rsrpthresholdCSI-RS, to perform random access.

It should be understood that FIG. 1 is merely an example schematic diagram of a beam form of a communications system. The beam form may alternatively be another form, and the communications system may alternatively include another network element device or functional unit. This is not limited in this application.

Figure 2:
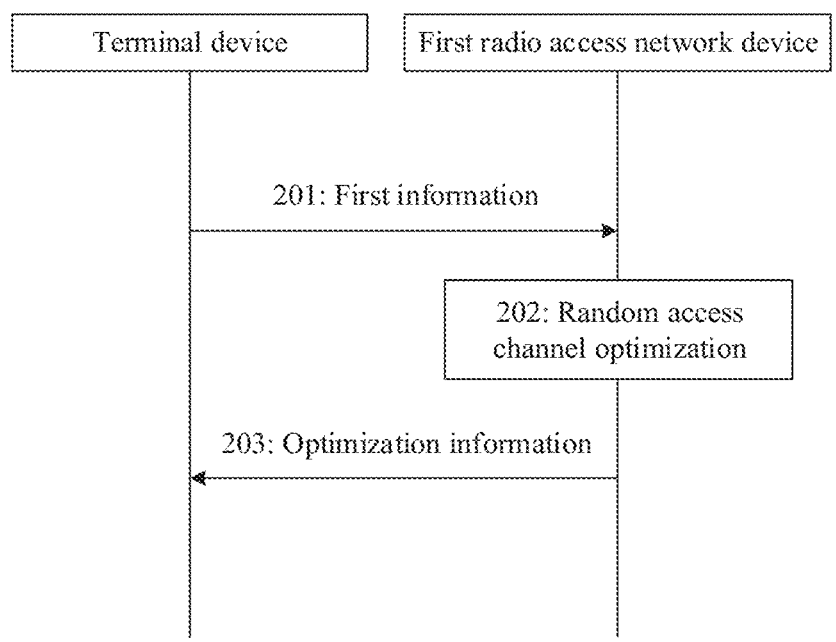
FIG. 2 is a schematic flowchart of a communication method according to an embodiment of this application.

FIG. 2 is a schematic flowchart of a communication method according to an embodiment of this application. The following specifically describes the technical solutions in the embodiments of this application with reference to FIG. 2. For example, the communication method corresponding to FIG. 2 may include the following steps.

Operation 201: A terminal device sends first information to a first radio access network device.

For example, the first information may include any one or more of the following: an identifier of a beam used by the terminal device in a random access process, random access information of the terminal device on the beam, a measurement result of the beam used by the terminal device in the random access process, an identifier of an uplink carrier used by the terminal device for random access, random access information of the terminal device on the uplink carrier, a measurement result of the uplink carrier used by the terminal device in the random access process, an identifier of a bandwidth part used by the terminal device for random access, random access information of the terminal device in the BWP, information about the bandwidth part, and a measurement result of the terminal device in the bandwidth part. According to this design, an example beneficial effect includes the following: The radio access network device can accurately optimize a random access channel in a timely manner for different beams, different uplink carriers, or different bandwidth parts, to improve an access success rate of a system, reduce a delay of a random access process, reduce a quantity of random access attempts, and reduce a contention-based access conflict probability, thereby improving user experience in a random access process of the terminal device.

Optionally, the beam used by the terminal device in the random access process may be a beam used by the terminal device when random access fails in a random access process; or optionally, the beam used by the terminal device in the random access process may be a beam used by the terminal device when random access succeeds in a random access process; or optionally, the beam used by the terminal device in the random access process may be a beam used by the terminal device when random access succeeds in a random access process and a beam used by the terminal device when random access fails in a random access process. According to this design, information obtained when a failure and/or a success occurs in a random access process can be learned. An example beneficial effect includes: The random access channel can be comprehensively and accurately optimized.

The identifier of the beam may include any one of the following: an identifier of an SSB, an identifier of a CSI-RS, an identifier of a cell in which the SSB is located, or an identifier of a cell in which the CSI-RS is located. The SSB identifier may be used to identify an SSB. For example, the SSB identifier may be an SSB group number, an SSB index, or the like. The CSI-RS identifier may be used to identify a CSI-RS. For example, the CSI-RS identifier may be a CSI-RS group number, a CSI-RS index, or the like. The identifier of the cell may be a PCI, a CGI, or the like. According to this design, an example beneficial effect includes the following: The radio access network device can identify random access information of different beams, and further accurately optimize a random access channel for a beam in a timely manner by using random access information of the beam that is sent by the terminal device to the radio access network device.

The measurement result of the beam used by the terminal device in the random access process may include any one or more of the following: the identifier of the SSB, the identifier of the CSI-RS, the identifier of the cell in which the SSB is located, the identifier of the cell in which the CSI-RS is located, a frequency of the SSB, a signal to interference plus noise ratio (SINR) of the SSB, reference signal received power (RSRP) of the SSB, reference signal received quality (RSRQ) of the SSB, a frequency of the CSI-RS, an SINR of the CSI-RS, RSRP of the CSI-RS, and RSRQ of the CSI-RS. The identifier of the cell may be a PCI, a CGI, or the like. According to this design, an example beneficial effect includes: The radio access network device can obtain more information about the beam, so as to obtain a more accurate optimization result.

Optionally, the uplink carrier used by the terminal device in the random access process may be an uplink carrier used by the terminal device when random access fails in a random access process; or optionally, the uplink carrier used by the terminal device in the random access process may be an uplink carrier used by the terminal device when random access succeeds in a random access process; or optionally, the uplink carrier used by the terminal device in the random access process may be an uplink carrier used by the terminal device when random access succeeds in a random access process and an uplink carrier used by the terminal device when random access fails in a random access process. According to this design, information obtained when a failure and/or a success occurs in a random access process can be learned. An example beneficial effect includes: The random access channel can be comprehensively and accurately optimized.

The uplink carrier may include a normal uplink carrier and a supplementary uplink carrier. Differences between the two types of carriers include at least different frequencies and different coverage areas. Frequencies of a normal uplink carrier and a downlink carrier are generally higher than a frequency of a supplementary uplink carrier. Generally, a higher frequency of an electromagnetic wave indicates a smaller coverage area of the electromagnetic wave. Therefore, a coverage area of a supplementary uplink carrier or a coverage area of a downlink carrier is generally greater than a coverage area of a normal uplink carrier.

For example, uplink carriers in an NR system may include a conventional uplink (UL) carrier and a supplementary uplink (SUL) carrier. When the terminal device performs initial random access, the terminal device may determine, by comparing measured reference signal strength of an SUL with a reference signal received power threshold (for example, rsrpthresholdSUL) of an SUL, whether to select a conventional UL carrier or the SUL carrier. For example, the reference signal received power threshold of the SUL may be configured by the radio access network device for the terminal device by using RRC signaling. For example, the radio access network device sends the rsrpthresholdSUL to the terminal device by using broadcast information, so that the terminal device selects the SUL or the UL during initial random access. Alternatively, when the terminal device is in a handover scenario, the radio access network device may instruct, by using dedicated signaling, the terminal device to use the UL or the SUL or both.

In this application, to distinguish from the supplementary uplink carrier, a conventional uplink carrier is referred to as a normal uplink carrier. In other words, the conventional uplink carrier and the normal uplink carrier are equivalent in this application. Uplink carriers in this application may include the normal uplink carrier and/or the supplementary uplink carrier.

The identifier of the uplink carrier may include an identifier of a supplementary uplink carrier or an identifier of a normal uplink carrier. For example, the identifier of the uplink carrier may include any one or more of the following: an identifier of a cell in which the SUL is located, an identifier of the SUL, a carrier identifier of the SUL, a carrier frequency of the SUL, an identifier of a cell in which the UL is located, an identifier of the UL, a carrier identifier of the UL, and a carrier frequency of the UL. The identifier of the cell may be a PCI, a CGI, or the like. According to this design, an example beneficial effect includes the following: The radio access network device can identify random access information of different uplink carriers, and further accurately optimize a random access channel for an uplink carrier in a timely manner by using random access information of the uplink carrier that is sent by the terminal device to the radio access network device.

The first information may further include the measurement result of the uplink carrier used by the terminal device in the random access process, and the measurement result information of the uplink carrier is any one or more of the following: the identifier of the cell in which the UL is located, a frequency of the UL, a SINR of the UL, RSRP of the UL, or RSRQ of the UL, the identifier of the cell in which the SUL is located, a frequency of the SUL, a SINR of the SUL, RSRP of the SUL, and RSRQ of the SUL. The identifier of the cell may be a PCI, a CGI, or the like. According to this design, an example beneficial effect includes: The radio access network device can obtain more information about the uplink carrier, so as to obtain a more accurate optimization result.

Optionally, the bandwidth part (BWP) used by the terminal device in the random access process may be a bandwidth part used by the terminal device when random access fails in a random access process; or optionally, the bandwidth part used by the terminal device in the random access process may be a bandwidth part used by the terminal device when random access succeeds in a random access process; or optionally, the bandwidth part used by the terminal device in the random access process may be a bandwidth part used by the terminal device when random access succeeds in a random access process and a bandwidth part used by the terminal device when random access fails in a random access process. According to this design, information obtained when a failure and/or a success occurs in a random access process can be learned. An example beneficial effect includes: The random access channel can be comprehensively and accurately optimized.

For example, the identifier of the BWP may include any one or more of the following: an identifier of a cell in which the BWP is located, an identity of the BWP, and information about the BWP.

The information about the BWP may include any one or more of the following: a location and bandwidth, a subcarrier spacing, information used by the BWP in an uplink direction, and information used by the BWP in a downlink direction. The information used by the BWP in the uplink or downlink direction may include any one or more of the following: a common configuration, a dedicated configuration, and the like. According to this design, an example beneficial effect includes the following: The radio access network device can identify random access information of different bandwidth parts, and further accurately optimize a random access channel for a bandwidth part in a timely manner by using random access information of the bandwidth part that is sent by the terminal device to the radio access network device.

The measurement result of the BWP may include any one or more of the following: an identifier of a cell in which the BWP is located, a frequency or frequency band of the BWP, an SINR of the BWP, RSRP of the BWP, and RSRQ of the BWP. According to this design, an example beneficial effect includes: The radio access network device can obtain more information about the bandwidth part, so as to obtain a more accurate optimization result.

The random access information may include any one or more of the following: a quantity of preamble attempt times (number of preambles sent), preamble information used in a preamble attempt, conflict indication information (contention detected), load information of the random access channel, load information of a physical uplink shared channel, maximum power arrival indication information, failure duration information, access delay information, path loss estimation information, backoff time information (backoff time), information about data available for transmission, and a random access type. The quantity of preamble attempt times may be information about a quantity of preamble access attempts made by the terminal device in a process from initiating preamble transmission to successfully performing random access to a network. The conflict indication information may be information about whether conflict resolution fails or whether a conflict of a preamble is detected. The maximum power arrival indication information may be information about whether a transmitted preamble reaches a maximum power level. The failure duration information may be information about a time of a random access attempt made by the terminal device. The access delay information may be information about a time from a moment at which the terminal device initiates preamble transmission to a moment at which random access succeeds. The path loss estimation information may be information about a path loss generated when the terminal device makes a random access attempt. The backoff time information may be information about a delay time of a network backoff control mechanism in the random access process. The random access type may include at least one of system information request (on demand system information), RRC connection establishment, and beam failure recovery (BFR). The random access type of system information request may further include at least one of a type of a message 1 (Msg1) request and a type of a message 3 (Msg3) request. The message 1 and the message 3 may be the first message and the third message in a random access process. The first message is usually a preamble sent by the terminal device to the base station, and the third message is usually an RRC connection request message. The system information request means that the terminal device requests to obtain system broadcast information from a network side by sending a random access request message. The beam failure recovery is a process in which the terminal device reselects a beam for recovery after detecting a beam failure. For example, the terminal device reselects a beam for recovery after detecting that a beam signal is weak. According to this design, an example beneficial effect includes: The radio access network device can obtain information about more types of random access, so as to obtain a more accurate optimization result.

For a terminal device in an idle state or an inactive state, a measurement result of a beam used by the terminal device in a random access process, a measurement result of an uplink carrier used by the terminal device in a random access process, or a measurement result of a bandwidth part used by the terminal device may be measurement information within a specific range. The specific range may be preconfigured by the first radio access network device for the terminal device. For example, the specific range may be any one or more of a radio access network area code (RANAC) list, a cell list, a base station list, a tracking area (TA) list, and a public land mobile network (PLMN) list. For example, the measurement result may be a beam measurement result of a primary serving cell, and/or a beam measurement result of a neighboring cell. For example, the measurement result may be a measurement result of an uplink carrier of a primary serving cell, and/or a measurement result of an uplink carrier of a neighboring cell. For example, the measurement result may be a measurement result of a BWP of a primary serving cell, and/or a measurement result of a BWP of a neighboring cell. According to this design, an example beneficial effect includes: A specific measurement range can be flexibly configured by using a radio access network device, to flexibly manage a measurement area.

Optionally, the first radio access network device may send a request message to the terminal device, where the request message is used to request the terminal device to send the first information to the first radio access network device. Optionally, the request message may be used to request the terminal device to send any one or more pieces of information in the first information to the first radio access network device. Optionally, the request message sent by the first radio access network device to the terminal device may include indication information, and the indication information may be used to indicate the terminal device to send any one or more pieces of information in the first information to the first radio access network device. For example, the any one or more pieces of information may be beam-related information in the first information, may be information that is in the first information and that is related to an uplink carrier, or may be information that is in the first information and that is related to a bandwidth part. The indication information may alternatively be used to indicate a type of random access channel optimization performed by the first radio access network device, for example, indicate random access channel optimization for RRC connection establishment, or indicate random access channel optimization for beam failure recovery, or indicate random access channel optimization for system information request. The indication information may be in a form of a bit string or a bitmap. For example, "01" is used to indicate that the terminal device needs to send beam-related information in the first information to the radio access network device, or indicate the first radio access network device to perform random access channel optimization for system information request; "10" is used to indicate that the terminal device needs to send information that is in the first information and that is related to an uplink/downlink carrier to the radio access network device, or indicate the first radio access network device to perform random access channel optimization for RRC connection establishment; and "11" is used to indicate that the terminal device needs to send information that is in the first information and that is related to the bandwidth part to the radio access network device, or indicate the first radio access network device to perform random access channel optimization for beam failure recovery. Alternatively, the indication information may be indication information of a measurement event, or may be an indication in another form. This is not limited in the present disclosure. The request message may be an RRC message, for example, a UE information request message, or another message. This is not limited in the present disclosure. According to this design, an example beneficial effect includes the following: The radio access network device can flexibly obtain, from the terminal device, information that is required by the network side for random access channel optimization. In addition, compared with a solution in which the terminal device periodically sends the first information to the radio access network device, this design can enable the terminal device to send the first information to the radio access network device more efficiently.

Optionally, the terminal device may periodically send the first information to the first radio access network device. The period may be preconfigured by the network side device for the terminal device. For example, periodically sending the first information to the first radio access network device may be sending the first information at specific time intervals, or may be sending the first information each time a specific quantity of successful access times is reached. According to this design, an example beneficial effect includes the following: Compared with a case in which the first radio access network device requests the terminal device to send the first information, the first radio access network device does not need to send the request information, so that signaling overheads between devices are reduced, and system complexity is reduced.

Optionally, the terminal device may alternatively send the first information to the first radio access network device based on an event trigger. The sending the first information based on an event trigger may be that the terminal device sends the first information to the first radio access network device only when an event inside the terminal device occurs, or may be that the terminal device sends the first information to the first radio access network device only when an event inside the terminal device occurs for a period of time, or may be that the terminal device sends the first information to the first radio access network device only when an event inside the terminal device occurs for a specific quantity of times. For example, the terminal device may send the first information to the first radio access network device when the terminal device successfully performs random access for a specific quantity of times. The event may be preconfigured by the network side device for the terminal device. According to this design, an example beneficial effect includes the following: Compared with a case in which the first radio access network device requests the terminal device to send the first information, the first radio access network device does not need to send the request information, so that signaling overheads between devices are reduced, and system complexity is reduced.

For example, if the terminal device is in an idle state, the terminal device may send the first information to the first radio access network device after being connected to a network. If the terminal device is in an inactive state, the terminal device may send the first information to the first radio access network device after being switched to a connected state. According to this design, an example beneficial effect includes: The terminal device can send the first information to the radio access network device at a proper time, thereby reducing system complexity.

For example, the first information may be sent in a form of a random access (RACH) report, or may be sent in a form of a connection failure report (for example, connectionestablishreport or connestfailreport), or may be sent in a form of a radio link failure report, or may be sent in a form of a log measurement report, or may be sent in a form of a mobility history report, or may be sent by using a newly defined message as a new report. For example, the first information may be sent by using any one of an RRC message, a MAC control message, a physical layer message, or a newly defined message. It may be understood that the any one or more pieces of information included in the first information herein may be separately carried in different messages and sent in different forms. This is not limited in this application. According to this design, an example beneficial effect includes the following: The terminal device can send the first information to the radio access network device in an appropriate form by using an appropriate message, thereby improving efficiency of sending the first information.

Operation 202: The first radio access network device optimizes the random access channel.

The first radio access network device receives the first information from the terminal device, and optimizes the random access channel based on the first information.

For example, that the first radio access network device optimizes the random access channel based on the first information may be any one or more of the following cases:

In a first case, the first radio access network device may optimize an RSRP threshold of the SSB based on at least one of the identifier of the SSB used by the terminal device in the random access process, random access information of the terminal device on the SSB, and a measurement result of the SSB used by the terminal device in the random access process that are included in the first information. For example, the first radio access network device identifies an SSB in which a preamble used when the terminal device makes a random access attempt is located. If random access frequently fails on an SSB but succeeds on another SSB, an SSB RSRP threshold may be adjusted, to prevent the terminal device from selecting, in a random access process, the SSB on which random access frequently fails, or to enable the terminal device to select, during the first random access, the SSB on which random access frequently succeeds to perform random access.

In a second case, the first radio access network device may optimize an RSRP threshold of the CSI-RS based on at least one of the identifier of the CSI-RS used by the terminal device in the random access process, random access information of the terminal device on the CSI-RS, and a measurement result of the CSI-RS used by the terminal device in the random access process that are included in the first information. For example, the first radio access network device identifies a CSI-RS in which a preamble used when the terminal device makes a random access attempt is located. If random access frequently fails on a CSI-RS but succeeds on another CSI-RS, a CSI-RS RSRP threshold may be adjusted, to prevent the terminal device from selecting, in a random access process, the CSI-RS on which random access frequently fails, or to enable the terminal device to select, during the first random access, the CSI-RS on which random access frequently succeeds to perform random access.

In a third case, the first radio access network device may optimize an RSRP threshold of the SUL based on at least one of the identifier of the uplink carrier used by the terminal device in the random access process, the random access information of the terminal device on the uplink carrier, and the measurement result of the uplink carrier used by the terminal device in the random access process that are included in the first information. For example, the first radio access network device identifies an uplink carrier used when the terminal device makes a random access attempt, for example, an UL or an SUL. If random access frequently fails on an uplink carrier, an SUL RSRP threshold may be adjusted, to prevent the terminal device from selecting, in a random access process, the uplink carrier on which random access frequently fails, or to enable the terminal device to select, during the first random access, an uplink carrier on which random access frequently succeeds to perform random access.

In a fourth case, the first radio access network device may optimize bandwidth part selection based on at least one of the identifier of the bandwidth part used by the terminal device for random access, the random access information of the terminal device on the BWP, the information about the bandwidth part, and the measurement result of the terminal device on the bandwidth part that are included in the first information. For example, the first radio access network device identifies a BWP on which the terminal device is located when the terminal device makes a random access attempt. If random access frequently fails on a BWP, optimization of bandwidth part selection may be performed, to prevent the terminal device from selecting, in a random access process, the BWP on which random access frequently fails, or to enable the terminal device to choose, during the first random access, to perform random access on a BWP on which random access frequently succeeds.

In a fifth case, the first radio access network device may optimize a random access channel resource based on content included in the first information. For example, the random access channel resource may include a time-frequency resource corresponding to each SSB or CSI-RS, or a preamble group included in each SSB or CSI-RS. For example, the first radio access network device may properly adjust allocation of the random access channel resource based on content of the first information, so that the random access channel resource occupies a minimum system uplink bandwidth with respect to system load. For example, the first radio access network device may further properly adjust parameters such as initial transmit/receive power and a step of the preamble based on content of the first information, so that the initial transmit/receive power is kept to a minimum when a quantity of random access attempts is relatively small. For example, the first radio access network device may further properly adjust a preamble group based on content of the first information, to reduce a contention-based access conflict probability and reduce a contention handover probability.

According to this design, the radio access network device can optimize any one or more of the RSRP threshold that is of the channel state information reference signal and that is configured by the radio access network device for the terminal device, the RSRP threshold that is of the synchronization signal block and that is configured by the radio access network device for the terminal device, the RSRP threshold that is of the supplementary uplink and that is configured by the radio access network device for the terminal device, the BWP selection, and the random access channel resource. An example beneficial effect includes: The radio access network device can accurately optimize a random access configuration parameter in a timely manner, an access success rate of a system is improved, a delay of a random access process is reduced, a quantity of random access attempts is reduced, a contention-based access conflict probability is reduced, and user experience in a random access process of the terminal device is improved.

The random access channel optimization means optimizing a related parameter of a random access channel. The related parameter of the random access channel may include any one or more of the following: a signal threshold of a beam, for example, an RSRP threshold of an SSB or an RSRP threshold of a CSI-RS, an RSRP threshold of an SUL, a random access preamble group, a random access backoff parameter, a random access power control parameter, a packet random access channel resource configuration parameter, a random access priority, and the like. Optionally, the related parameter of the random access channel may be a random access channel parameter of the beam on which the terminal device is located, or may be a random access channel parameter of the uplink carrier on which the terminal device is located, or may be a random access channel parameter of the bandwidth part on which the terminal device is located. This is not limited in the present disclosure. Optionally, the related parameter of the random access channel may be a related parameter of the random access channel for system information request, or may be a related parameter of the random access channel for RRC connection establishment, or may be a related parameter of the random access channel for beam failure recovery. The related parameter of the random access channel for beam failure recovery may include a BFR timer and the like. According to this design, an example beneficial effect includes the following: The radio access network device can optimize more random access configuration parameters of different types, and optimize the random access channel more comprehensively.

Operation 203: The first radio access network device sends optimization information to the terminal device.

For example, the first radio access network device sends the optimization information of the random access channel to the terminal device. The optimization information may include at least one of an optimized SSB RSRP threshold, an optimized CSI-RS RSRP threshold, an optimized SUL RSRP threshold, an optimized BWP, or an optimized random access channel resource that is obtained in operation 202. According to this design, an example beneficial effect includes the following: An access success rate of a system is improved, a delay of a random access process is reduced, a quantity of random access attempts is reduced, a contention-based access conflict probability is reduced, and user experience in a random access process of the terminal device is improved.

Optionally, the optimization information sent by the first radio access network device to the terminal device may include optimization information indicating that the optimization information belongs to any type of random access for system information request, random access for RRC connection establishment, and random access for beam failure recovery.

Operation 203 is optional.

For example, the first radio access network device in FIG. 2 may be an eNB in an LTE standard, or may be a gNB in an NR standard, or may be a master node (MN) in a dual-connectivity architecture, or may be a secondary node (SN) in the dual-connectivity (DC) architecture, or may be an MN in a multi-connectivity (MC) architecture, or may be an SN in the multi-connectivity architecture. A network device type of the first radio access network device is not limited in this application. For example, the terminal device may have communication connections to two radio access network devices at the same time and may receive and send data, which may be referred to as dual-connectivity (DC). In the two radio access network devices, one radio access network device may be responsible for exchanging a radio resource control message with the terminal device, and is responsible for interacting with a core network control plane entity. In this case, the radio access network device may be referred to as a master node (MN), and the other radio access network device may be referred to as a secondary node (SN). Similarly, if the terminal device may have communication connections to a plurality of radio access network devices at the same time and can receive and send data, this may be referred to as multi-connectivity (MC). In the plurality of radio access network devices, one radio access network device may be responsible for exchanging a radio resource control message with the terminal device, and is responsible for interacting with a core network control plane entity. In this case, the radio access network device may be referred to as an MN, and the remaining radio access network devices may be referred to as SNs.

For example, in a multi-connectivity scenario, when the terminal device needs to randomly access a target radio access network device, if the terminal device successfully randomly accesses the target radio access network device, the terminal device sends the first information to the target radio access network device and/or the first radio access network device, and the first radio access network device and/or the target radio access network device perform/performs random access channel optimization based on the received first information. Otherwise, if the terminal device fails to perform random access to the target radio access network device, the terminal device may record content included in the first information in a radio link failure report, and send the radio link failure report including the content of the first information to the first radio access network device. The first radio access network device performs random access channel optimization based on the received first information. Optionally, the first radio access network device may notify the target radio access network device to perform random access channel optimization. For example, the first radio access network device may be a master node in a multi-connectivity architecture, and the target radio access network device may be a secondary node in the multi-connectivity architecture. Optionally, the target radio access network device may support a CU-DU architecture. According to this design, an example beneficial effect includes: When the terminal device is in a multi-connectivity scenario, the network side device can accurately optimize the random access channel in a timely manner.

For example, when the terminal device is in a mobile handover scenario, the first radio access network device may be a source base station, the target radio access network device may be a target base station, and a new radio access network device is a radio access network device accessed by the terminal device through reselection after the terminal device fails to randomly access the target radio access network device. Optionally, the target radio access network device may support a CU-DU architecture. When the first radio access network device determines that the terminal device needs to be handed over to the target radio access network device, the terminal device performs random access to the target radio access network device. If the terminal device successfully randomly accesses the target radio access network device, the terminal device sends the first information to the target radio access network device, and the target radio access network device performs random access channel optimization based on the received first information. Otherwise, if the terminal device fails to randomly access the target radio access network device, the terminal device may record content included in the first information in a radio link failure report, and send the radio link failure report including the content of the first information to the new radio access network device after the terminal device accesses the new radio access network device through reselection. The new radio access network device performs random access channel optimization based on the received radio link failure report including the content of the first information. Optionally, the new radio access network device may notify the target radio access network device to perform random access channel optimization. The new radio access network device may be the first radio access network device. According to this design, an example beneficial effect includes: When the terminal device is in a mobile handover scenario, the network side device can accurately optimize the random access channel in a timely manner.

Figure 3:
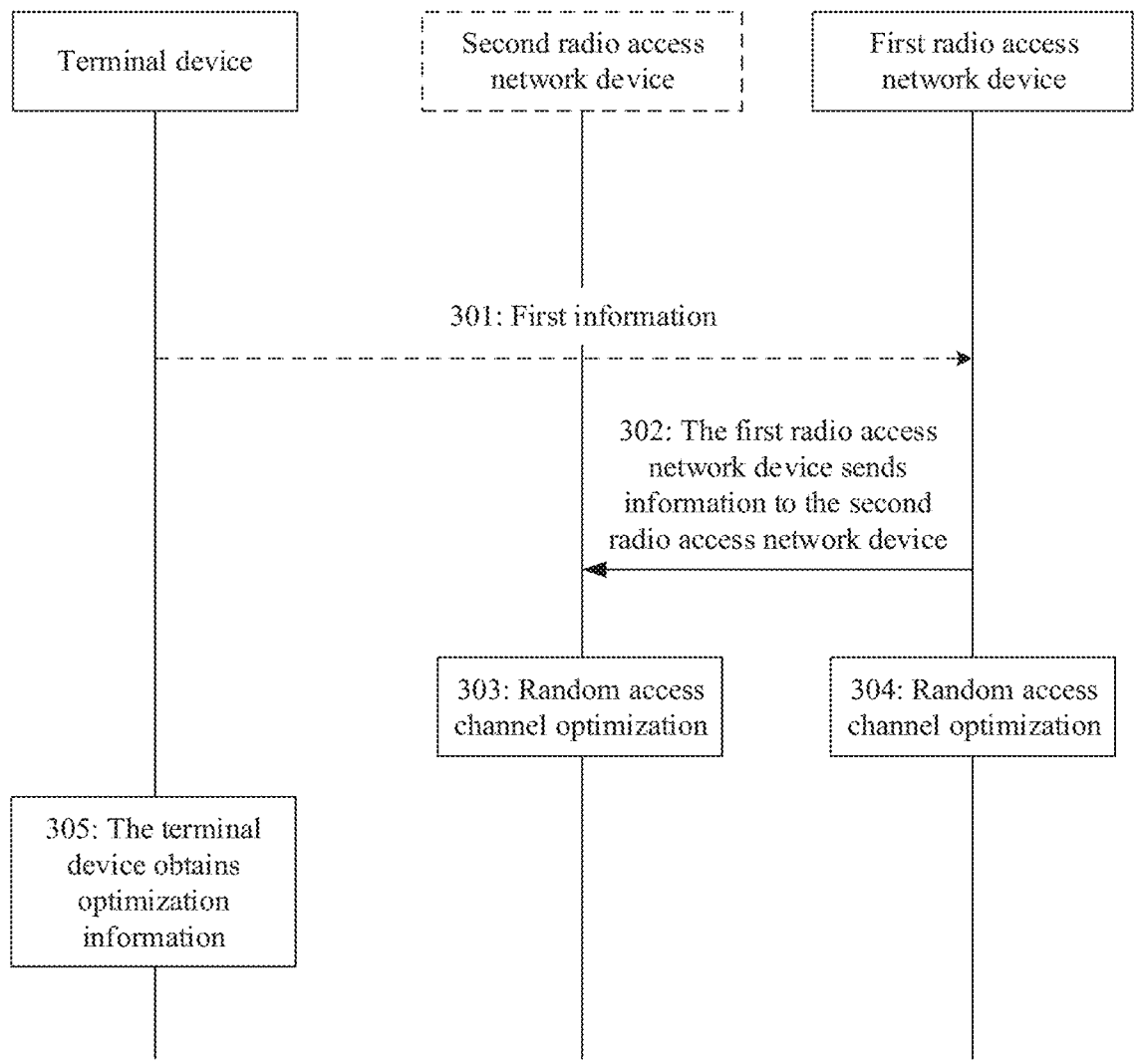
FIG. 3 is a schematic flowchart of a communication method according to an embodiment of this application.

FIG. 3 is a schematic flowchart of a communication method according to an embodiment of this application. The following specifically describes the technical solutions in the embodiments of this application with reference to FIG. 3. For example, the communication method corresponding to FIG. 3 may include the following steps.

Operation 301: A first radio access network device receives first information from a terminal device.

The first radio access network device receives the first information from the terminal device. For content included in the first information, refer to operation 201. Details are not described herein again.

For example, the terminal device may send the first information to the first radio access network device. Optionally, a second radio access network device may send the first information to the first radio access network device after the terminal device sends the first information to the second radio access network device. In this case, the terminal device does not need to send the first information to the first radio access network device. According to this design, an example beneficial effect includes: The first radio access network device can obtain the first information more flexibly.

If the terminal device sends the first information to the first radio access network device, the first radio access network device may send a request message to the terminal device. For content included in the request message used to request the terminal device to send the first information to the first radio access network device, refer to operation 201. Details are not described herein again.

If the terminal device sends the first information to the first radio access network device, the second radio access network device may send a request message to the terminal device. For content included in the request message used to request the terminal device to send the first information to the first radio access network device, refer to operation 201. Details are not described herein again.

If the terminal device sends the first information to the second radio access network device, the second radio access network device may send a request message to the terminal device. For content included in the request message used to request the terminal device to send the first information to the second radio access network device, refer to operation 201. Details are not described herein again.

According to this design, an example beneficial effect includes: Compared with periodically sending the first information to the radio access network device by the terminal device, the terminal device can send the first information to the radio access network device more efficiently.

For example, if the terminal device is in an idle state, the terminal device may send the first information to the first radio access network device after being connected to a network. If the terminal device is in an inactive state, the terminal device may send the first information to the first radio access network device after being switched to a connected state. According to this design, an example beneficial effect includes: The terminal device can send the first information to the radio access network device at a proper time, thereby reducing system complexity.

For example, the first information may be sent in a form of a random access (RACH) report, or may be sent in a form of a connection failure report (for example, connectionestablishreport or connestfailreport), or may be sent in a form of a radio link failure report, or may be sent in a form of a log measurement report, or may be sent in a form of a mobility history report, or may be sent by using a newly defined message as a new report. For example, the first information may be sent by using any one of an RRC message, a MAC control message, a physical layer message, or a newly defined message. It may be understood that the any one or more pieces of information included in the first information herein may be separately carried in different messages and sent in different forms. This is not limited in this application. According to this design, an example beneficial effect includes the following: The terminal device can send the first information to the radio access network device in an appropriate form by using an appropriate message, thereby improving efficiency of sending the first information.

Operation 302: The first radio access network device sends information to the second radio access network device.

For example, that the first radio access network device sends information to the second radio access network device may be that the second radio access network device sends a request message to the first radio access network device, where the request message is used to request the first radio access network device to send content included in the first information to the second radio access network device. Optionally, the request message may be used to request the first radio access network device to send any one or more pieces of information in the first information to the second radio access network device. Optionally, the request message sent by the second radio access network device to the first radio access network device may include indication information, and the indication information may be used to indicate the first radio access network device to send any one or more pieces of information in the first information to the second radio access network device. For example, the any one or more pieces of information may be beam-related information in the first information, information that is in the first information and that is related to an uplink carrier, or information that is in the first information and that is related to a bandwidth part. The indication information may alternatively be used to indicate a type of random access channel optimization performed by the second radio access network device, for example, indicate random access channel optimization for RRC connection establishment, or indicate random access channel optimization for beam failure recovery, or indicate random access channel optimization for system information request. The indication information may be in a form of a bit string or a bitmap. For example, "01" is used to indicate that the first radio access network device needs to send beam-related information in the first information to the second radio access network device, or indicate the second radio access network device to perform random access channel optimization for system information request; "10" is used to indicate that the first radio access network device needs to send information that is in the first information and that is related to an uplink/downlink carrier to the second radio access network device, or indicate the second radio access network device to perform random access channel optimization for RRC connection establishment; and "11" is used to indicate that the first radio access network device needs to send information that is in the first information and that is related to a bandwidth part to the second radio access network device, or indicate the second radio access network device to perform random access channel optimization for beam failure recovery. Alternatively, the indication information may be indication information of a measurement event, or may be an indication in another form. This is not limited in the present disclosure. The request message may be an F1AP message, or another newly defined message. This is not limited in the present disclosure. According to this design, an example beneficial effect includes: The second radio access network device can flexibly obtain, from the first radio access network device, required information used for random access channel optimization. In addition, compared with periodically sending any one or more pieces of information in the first information to the second radio access network device by the first radio access network device, the terminal device can send any one or more pieces of information in the first information to the radio access network device more efficiently.

Optionally, the first radio access network device may send any one or more pieces of information in the first information to the second radio access network device based on an event trigger. The sending based on an event trigger may be that the first radio access network device sends any one or more pieces of information in the first information to the second radio access network device only when an event inside the first radio access network device occurs, or may be that the first radio access network device sends any one or more pieces of information in the first information to the second radio access network device only when an event inside the first radio access network device occurs for a period of time, or may be that the first radio access network device sends any one or more pieces of information in the first information to the second radio access network device only when an event inside the first radio access network device occurs for a specific quantity of times. According to this design, an example beneficial effect includes the following: Compared with a case in which the second radio access network device requests the first radio access network device to send any one or more pieces of information in the first information, the second radio access network device does not need to send the request information, so that signaling overheads between devices are reduced, and system complexity is reduced.

According to this design, an example beneficial effect includes: The second radio access network device is assisted in optimizing a random access channel resource configured by a network side device for the terminal device. In addition, through information exchange between the first radio access network device and the second radio access network device, the two radio access network devices can be flexibly used to optimize a random access channel parameter configured by the network side device for the terminal device, thereby improving an access success rate of a system, reducing a delay of a random access process, reducing a quantity of random access attempts, reducing a contention-based access conflict probability, and improving user experience in a random access process of the terminal device.

Operation 303: The second radio access network device optimizes a random access channel.

For example, the second radio access network device optimizes the random access channel based on the information received from the first radio access network device in operation 302. For a process in which the second radio access network device optimizes the random access channel, refer to any one or more of the first case to the fifth case in operation 202.

Optionally, the first radio access network device may send at least one type of random access channel optimization information or result of random access channel optimization information or results of the first radio access network device to the second radio access network device, and may further send indication information at the same time. The indication information is used to indicate which type of random access channel optimization information or result is sent to the second radio access network device. For example, the indication information may indicate at least one of a random access channel optimization result or information for RRC connection establishment, a random access channel optimization result or information for beam failure recovery, or a random access channel optimization result or information for system information request.

According to this design, an example beneficial effect includes the following: In a scenario in which the first radio access network device and the second radio access network device are separated, the network side can obtain sufficient information used for random access channel optimization through mutual cooperation between the first radio access network device and the second radio access network device, so as to accurately optimize the random access channel in a timely manner.

Operation 304: The first radio access network device optimizes the random access channel.

For example, the first radio access network device optimizes the random access channel based on the first information received from the terminal device. For a process in which the first radio access network device optimizes the random access channel, refer to any one or more of the first case to the fifth case in operation 202.

Optionally, the first radio access network device may send at least one type of random access channel optimization information or result of random access channel optimization information or results of the first radio access network device to the second radio access network device, and may further send indication information at the same time. The indication information is used to indicate which type of random access channel optimization information or result is sent to the second radio access network device. For example, the indication information may indicate at least one of a random access channel optimization result or information for RRC connection establishment, a random access channel optimization result or information for beam failure recovery, or a random access channel optimization result or information for system information request.

According to this design, an example beneficial effect includes the following: In a scenario in which the first radio access network device and the second radio access network device are separated, the network side can obtain sufficient information used for random access channel optimization through mutual cooperation between the first radio access network device and the second radio access network device, so as to accurately optimize the random access channel in a timely manner.

Operation 305: The terminal device obtains optimization information.

For example, a process in which the terminal device obtains the optimization information may be as follows: The first radio access network device sends the random access channel optimization information of the first radio access network device to the second radio access network device, and the second radio access network device integrates the random access channel optimization information of the first radio access network device and random access channel optimization information of the second radio access network device, and then sends integrated optimization information to the terminal device by using, for example, a layer 1 message, a layer 2 message, or a broadcast message. Alternatively, the second radio access network device may send random access channel optimization information of the second radio access network device to the first radio access network device, and the first radio access network device integrates the random access channel optimization information of the first radio access network device and the random access channel optimization information of the second radio access network device, and then sends integrated optimization information to the terminal device by using, for example, a layer 3 message. Alternatively, the first radio access network device may send the random access channel optimization information of the first radio access network device to the terminal device by using, for example, a layer 3 message, and the second radio access network device sends the random access channel optimization information of the second radio access network device to the terminal device by using, for example, a layer 1 message, a layer 2 message, or a broadcast message. It may be understood that the random access channel optimization information of the first radio access network device and the second radio access network device may be exchanged through information transfer between the first radio access network device and the second radio access network device. Then, the second radio access network device sends the random access channel optimization information included in the second radio access network device to the terminal device by using a layer 1 message, a layer 2 message, a broadcast message, or other information, and the first radio access network device sends the random access channel optimization information included in the first radio access network device to the terminal device by using a layer 3 message or other information. An optimization information sending method and a message type are not limited in this application. According to this design, an example beneficial effect includes: The network side device can flexibly and effectively transmit a random access channel optimization result to the terminal device, so that an access success rate of a system is improved in a timely and accurate manner, a delay of a random access process is reduced, a quantity of random access attempts is reduced, a contention-based access conflict probability is reduced, and user experience in a random access process of the terminal device is improved.

Figure 4:
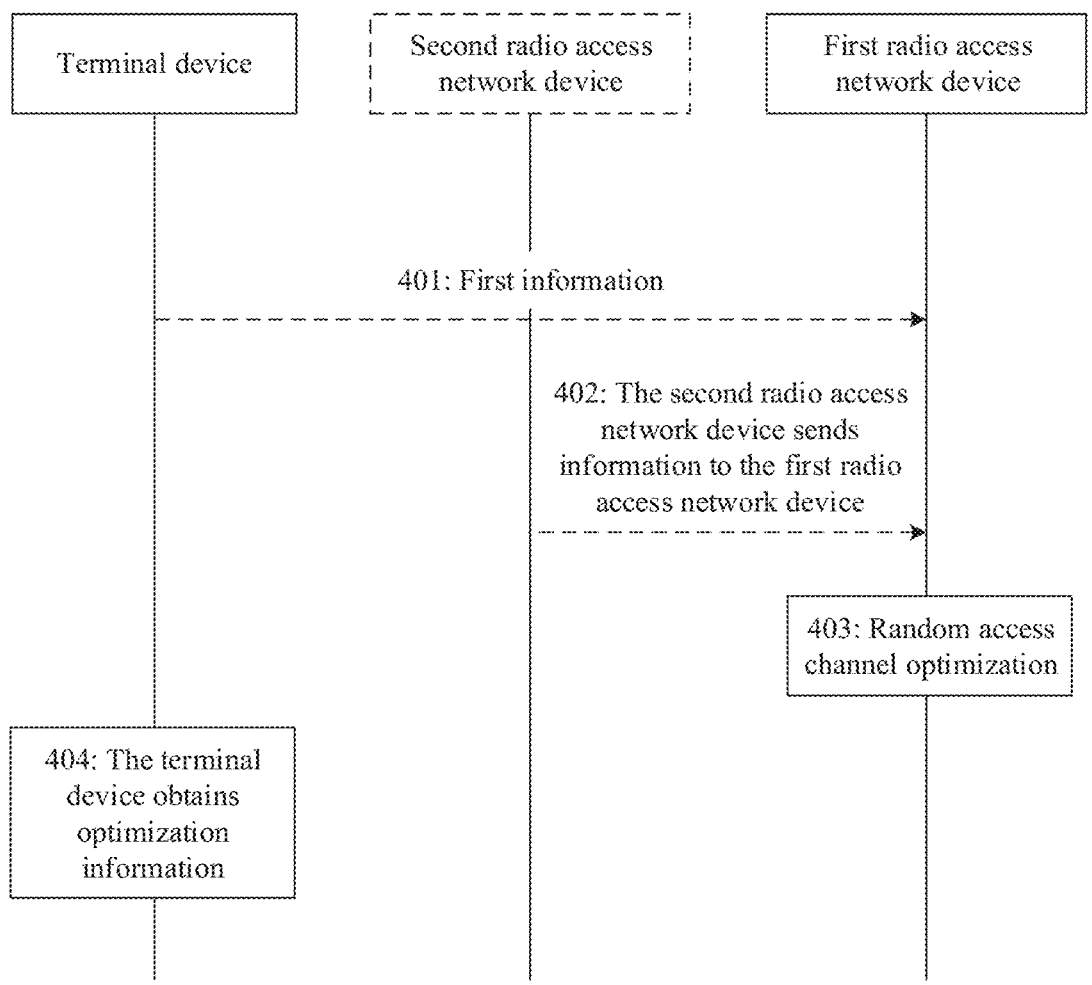
FIG. 4 is a schematic flowchart of a communication method according to an embodiment of this application.

FIG. 4 is a schematic flowchart of a communication method according to an embodiment of this application. The following specifically describes the technical solutions in the embodiments of this application with reference to FIG. 4. For example, the communication method corresponding to FIG. 4 may include the following steps.

Operation 401: For this operation, refer to operation 301, including the optional operation of 301. Details are not described herein again.

Operation 402: A second radio access network device sends information to the first radio access network device.

For example, the information may include load information of a random access channel. For example, the load information may include a call arrival rate, an incoming handover rate, and tracking area update information. Operation 402 is an optional operation. For example, if the first radio access network device can obtain, through statistics collection by the first radio access network device, the load information of the random access channel, the second radio access network device does not need to send the load information of the random access channel to the first radio access network device. According to this design, an example beneficial effect includes: The first radio access network device can obtain the load information of the random access channel more flexibly.

The operation 402 may be performed before the operation 401, or may be performed after the operation 401. This is not limited in the present disclosure.

Operation 403: The first radio access network device optimizes the random access channel.

For example, the first radio access network device optimizes the random access channel based on the first information received from the terminal device in operation 401 and the information received from the second radio access network device in operation 402. For a process in which the first radio access network device optimizes the random access channel, refer to any one or more of the first case to the fifth case in operation 202.

Optionally, the first radio access network device may send at least one type of random access channel optimization information or result of random access channel optimization information or results of the first radio access network device to the second radio access network device, and may further send indication information at the same time. The indication information is used to indicate which type of random access channel optimization information or result is sent to the second radio access network device. For example, the indication information may indicate at least one of a random access channel optimization result or information for RRC connection establishment, a random access channel optimization result or information for beam failure recovery, or a random access channel optimization result or information for system information request.

According to this design, an example beneficial effect includes the following: In a scenario in which the first radio access network device and the second radio access network device are separated on a network side, the first radio access network device can obtain sufficient information used for random access channel optimization through mutual cooperation between the first radio access network device and the second radio access network device, so as to accurately optimize the random access channel in a timely manner.

Operation 404: For this operation, refer to operation 305, including the optional operation in operation 305. Details are not described herein again.

Figure 5:
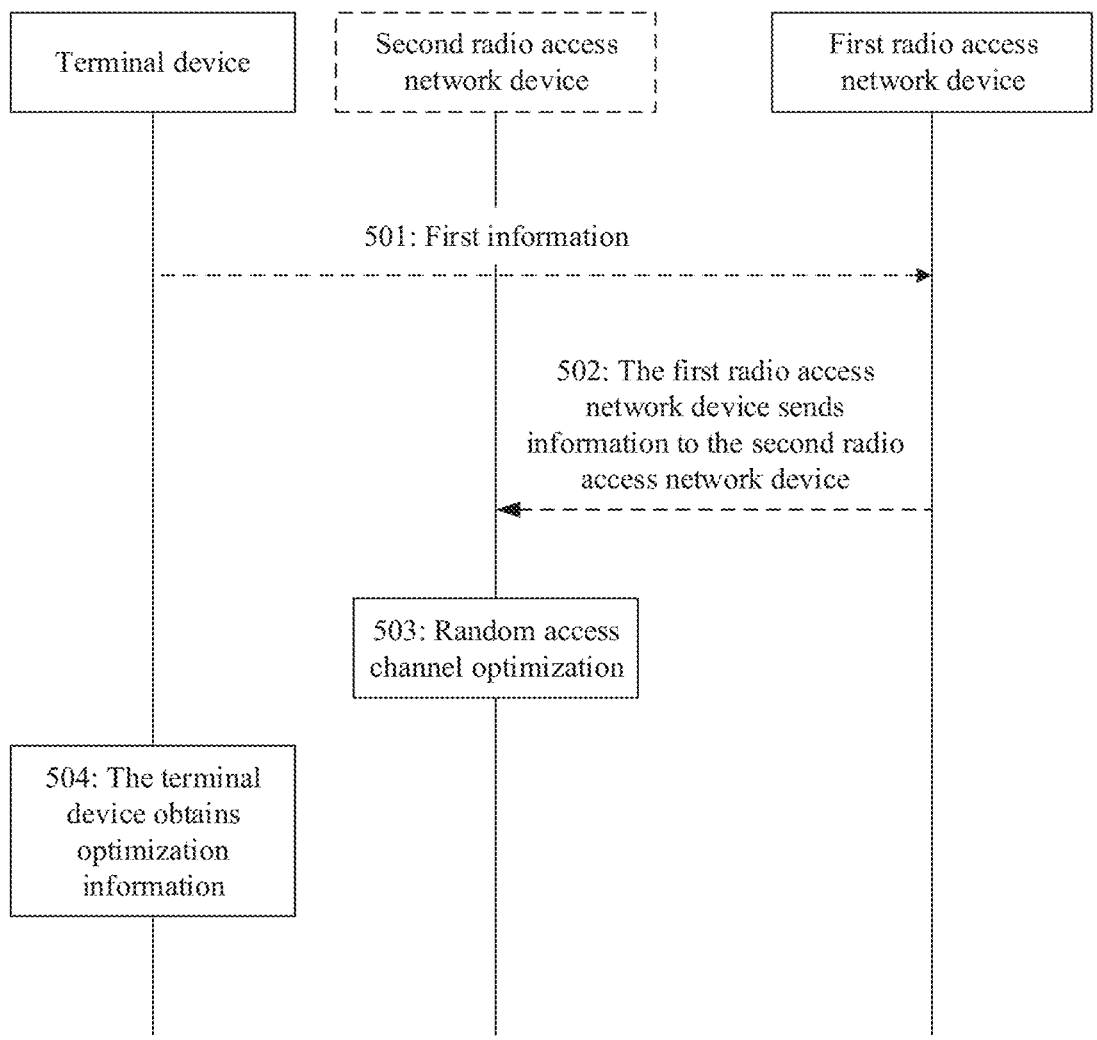
FIG. 5 is a schematic flowchart of a communication method according to an embodiment of this application.

FIG. 5 is a schematic flowchart of a communication method according to an embodiment of this application. The following specifically describes the technical solutions in the embodiments of this application with reference to FIG. 5. For example, the communication method corresponding to FIG. 5 may include the following steps.

Operation 501: For this operation, refer to operation 301, including the optional operation in operation 301. Details are not described herein again.

Operation 502: For this operation, refer to operation 302, including the optional operation in operation 302. Details are not described herein again.

Operation 501 and operation 502 are optional operations. For example, if the terminal device directly sends the first information to the second radio access network device, the terminal device does not need to send the first information to the first radio access network device, and the first radio access network device does not need to send any one or more pieces of information in the first information to the second radio access network device either.

Operation 503: For this operation, refer to operation 303, including the optional operation in operation 303. Details are not described herein again.

Operation 504: For this operation, refer to operation 305, including the optional operation in operation 305. Details are not described herein again.

According to this design, an example beneficial effect includes the following: In a scenario in which the first radio access network device and the second radio access network device are separated on a network side, the second radio access network device can obtain sufficient information used for random access channel optimization through mutual cooperation between the first radio access network device and the second radio access network device, so as to optimize the random access channel accurately in a timely manner.

In this application, FIG. 3, FIG. 4, and FIG. 5 each include the first radio access network device and the second radio access network device. The first radio access network device may be a CU in a CU-DU architecture, and the second radio access network device may be a DU in the CU-DU architecture. The first radio access network device and the second radio access network device may be CUs or DUs in an LTE standard, or the first radio access network device and the second radio access network device may be CUs or DUs in an NR standard. The first radio access network device may be a CU of a master node or a CU of a secondary node in a dual-connectivity architecture, and the second radio access network device may be a DU of the master node or a DU of the secondary node in the dual-connectivity architecture. The dual-connectivity architecture may be an LTE dual-connectivity architecture, or may be an NR dual-connectivity architecture, or may be an LTE-NR dual-connectivity architecture. The first radio access network device may be a CU of a master node or a CU of a secondary node in a multi-connectivity architecture, and the second radio access network device may be a DU of the master node or a DU of the secondary node in the multi-connectivity architecture. The multi-connectivity architecture may be an LTE multi-connectivity architecture, or may be an NR multi-connectivity architecture, or may be an LTE-NR multi-connectivity architecture.

For example, in a multi-connectivity scenario, when the terminal device needs to randomly access a target radio access network device, if the terminal device successfully randomly accesses the target radio access network device, the terminal device sends the first information to the target radio access network device and/or the first radio access network device, and the first radio access network device and/or the target radio access network device perform/performs random access channel optimization based on the received first information. Otherwise, if the terminal device fails to perform random access to the target radio access network device, the terminal device may record content included in the first information in a radio link failure report, and send the radio link failure report including the content of the first information to the first radio access network device. The first radio access network device performs random access channel optimization based on the received first information. Optionally, the first radio access network device may notify the target radio access network device to perform random access channel optimization. For example, the first radio access network device may be a master node in a multi-connectivity architecture, and the target radio access network device may be a secondary node in the multi-connectivity architecture. Optionally, the target radio access network device may support the CU-DU architecture. According to this design, an example beneficial effect includes: When the terminal device is in a multi-connectivity scenario, the network side device can accurately optimize the random access channel in a timely manner.

For example, when the terminal device is in a mobile handover scenario, the first radio access network device may be a source base station, the target radio access network device may be a target base station, and a new radio access network device is a radio access network device accessed by the terminal device through reselection after the terminal device fails to randomly access the target radio access network device. Optionally, the target radio access network device may support a CU-DU architecture. When the first radio access network device determines that the terminal device needs to be handed over to the target radio access network device, the terminal device performs random access to the target radio access network device. If the terminal device successfully randomly accesses the target radio access network device, the terminal device sends the first information to the target radio access network device, and the target radio access network device performs random access channel optimization based on the received first information. Otherwise, if the terminal device fails to randomly access the target radio access network device, the terminal device may record content included in the first information in a radio link failure report, and send the radio link failure report including the content of the first information to a new radio access network device after the terminal device accesses the new radio access network device through reselection. The new radio access network device performs random access channel optimization based on the received radio link failure report including the content of the first information. Optionally, the new radio access network device may notify the target radio access network device to perform random access channel optimization. The new radio access network device may be the first radio access network device. According to this design, an example beneficial effect includes: When the terminal device is in a mobile handover scenario, the network side device can accurately optimize the random access channel in a timely manner.

For example, the layer 1 message in this application is usually a PHY layer message, and the layer 2 message in this application is usually signaling of a MAC layer, an RLC layer, or a PDCP layer, for example, a MAC CE message. The layer 3 message in this application is usually RRC layer signaling or NAS layer signaling, for example, an RRC message. In this application, an F1AP message or a V1AP message may be used for interaction between the CU and the DU. For example, an existing F1AP message may be a gNB-CU/gNB-DU configuration update message, a gNB-CU/gNB-DU configuration update acknowledge message, a UE context setup/modification request (user equipment context setup/modification request) message, a UE context setup/modification response (user equipment context setup/modification response) message, a UE context setup/modification required (user equipment context setup/modification required) message, or a UE context release command/request/complete message.

Figure 6:
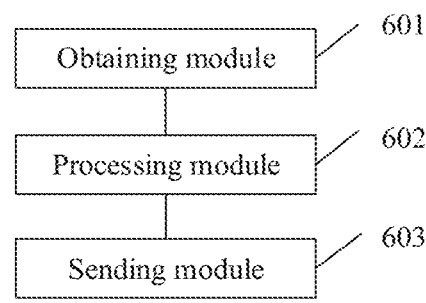
FIG. 6 is a schematic block diagram of a radio access network device according to an embodiment of this application.

Based on a similar technical concept, an embodiment of this application provides a communications apparatus. The apparatus may be the radio access network device in any possible design in the communication methods/systems provided in the methods 200 to 500 in the foregoing embodiments. The communications apparatus includes at least one corresponding unit configured to perform a method step, an operation, or behavior performed by the radio access network device in the communication methods/systems provided in 200 to 500. The at least one unit may be disposed in a one-to-one correspondence with the method step, the operation, or the behavior performed by the radio access network device. These units may be implemented by using a computer program, may be implemented by using a hardware circuit, or may be implemented by using a computer program in combination with a hardware circuit. For example, the following specifically describes a structure and functions of a radio access network device 600 with reference to FIG. 6 in the embodiments of this application. FIG. 6 is a schematic block diagram of the radio access network device 600 according to an embodiment of this application.

For example, this application provides a first radio access network device, including: an obtaining module 601, configured to receive first information from a terminal device, where the first information may include an identifier of a beam used by the terminal device for random access and random access information of the terminal device on the beam; and a processing module 602, configured to optimize a random access channel based on the first information. The identifier of the beam may be an identifier of a synchronization signal block or an identifier of a channel state information reference signal.

Optionally, the first information may further include a measurement result of the beam, and the measurement result of the beam may include any one or more of the following: an identifier of a cell in which the synchronization signal block is located, a frequency of the synchronization signal block, a signal to interference plus noise ratio of the synchronization signal block, reference signal received power of the synchronization signal block, reference signal received quality of the synchronization signal block, an identifier of a cell in which the channel state information reference signal is located, a frequency of the channel state information reference signal, a signal to interference plus noise ratio of the channel state information reference signal, reference signal received power of the channel state information reference signal, and reference signal received quality of the channel state information reference signal.

Optionally, the first information may further include an identifier of an uplink carrier used by the terminal device for random access and random access information of the terminal device on the uplink carrier. The identifier of the uplink carrier may be an identifier of a normal uplink carrier or an identifier of a supplementary uplink carrier.

Optionally, the first information may further include a measurement result of the uplink carrier, and the measurement result of the uplink carrier includes any one or more of the following: an identifier of a cell in which the normal uplink carrier is located, a frequency of the normal uplink carrier, a signal to interference plus noise ratio of the normal uplink carrier, reference signal received power of the normal uplink carrier, reference signal received quality of the normal uplink carrier, an identifier of a cell in which the supplementary uplink carrier is located, a frequency of the supplementary uplink carrier, a signal to interference plus noise ratio of the supplementary uplink carrier, reference signal received power of the supplementary uplink carrier, and reference signal received quality of the supplementary uplink carrier.

For example, that the processing module 602 optimizes the random access channel based on the first information includes any one or more of the following: optimizing a reference signal received power threshold of the synchronization signal block, optimizing a reference signal received power threshold of the channel state information reference signal, optimizing a reference signal received power threshold of the supplementary uplink carrier, and optimizing a random access channel resource.

Optionally, the first radio access network device may further include a sending module 603, configured to send any one or more pieces of information in the first information to a second radio access network device, where the any one or more pieces of information in the first information are used by the second radio access network device to optimize the random access channel based on the any one or more pieces of information in the first information. That the second radio access network device optimizes the random access channel based on the any one or more pieces of information in the first information may include: optimizing the random access channel resource.

For example, that the processing module 602 optimizes the random access channel based on the first information includes any one or more of the following: optimizing a reference signal received power threshold of the synchronization signal block, optimizing a reference signal received power threshold of the channel state information reference signal, and optimizing a reference signal received power threshold of the supplementary uplink carrier.

The first radio access network device may have a radio link control layer function, a medium access control layer function, and a physical layer function, and the second radio access network device may have a packet data convergence protocol layer function, a service data adaptation protocol layer function, and a radio resource control layer function. The first radio access network device and the second radio access network device may be components of a base station (gNB), or the first radio access network device and the second radio access network device constitute a base station (gNB). For example, the first radio access network device is a control unit (CU) of the gNB, and the second radio access network device is a distributed unit (DU) of the gNB; or the second radio access network device is a control unit (CU) of the gNB, and the first radio access network device is a distributed unit (DU) of the gNB.

This application provides a second radio access network device. The second radio access network device may include: an obtaining module 601, configured to receive any one or more pieces of information in first information from a first radio access network device, where for the first information, refer to the first information in the first aspect to the fourth aspect; and a processing module 602, configured to optimize a random access channel based on the any one or more pieces of information in the first information.

Optionally, the second radio access network device may further include a sending module 603, configured to send a request to the first radio access network device, where the request is used to request the first radio access network device to send the any one or more pieces of information in the first information to the second radio access network device.

For example, that the processing module 602 optimizes the random access channel based on the any one or more pieces of information in the first information may include: optimizing a random access channel resource.

The first radio access network device has a radio link control layer function, a medium access control layer function, and a physical layer function, and the second radio access network device has a packet data convergence protocol layer function, a service data adaptation protocol layer function, and a radio resource control layer function. The first radio access network device and the second radio access network device may be components of a base station (gNB), or the first radio access network device and the second radio access network device constitute a base station (gNB). For example, the first radio access network device is a control unit (CU) of the gNB, and the second radio access network device is a distributed unit (DU) of the gNB; or the second radio access network device is a control unit (CU) of the gNB, and the first radio access network device is a distributed unit (DU) of the gNB.

Figure 7:
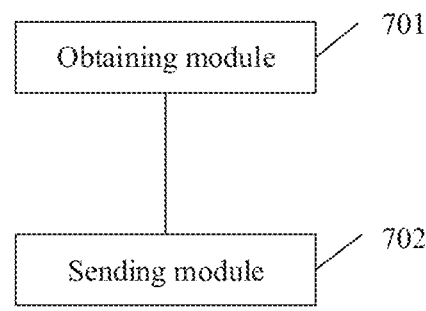
FIG. 7 is a schematic block diagram of a terminal device according to an embodiment of this application.

Based on a similar technical concept, an embodiment of this application provides a communications apparatus. The apparatus may be the terminal device in any possible design in the communication methods/systems provided in the methods 200 to 500 in the foregoing embodiments. The communications apparatus includes at least one corresponding unit configured to perform a method step, an operation, or behavior performed by the terminal device in the communication methods/systems provided in 200 to 500. The at least one unit may be disposed in a one-to-one correspondence with the method step, the operation, or the behavior performed by the terminal device. These units may be implemented by using a computer program, may be implemented by using a hardware circuit, or may be implemented by using a computer program in combination with a hardware circuit. For example, the following specifically describes a structure and functions of a terminal device 700 with reference to FIG. 7 in the embodiments of this application. FIG. 7 is a schematic block diagram of the terminal device 700 according to an embodiment of this application.

For example, this application provides a terminal device, including a sending module 702, configured to send first information to a first radio access network device, where the first information may include an identifier of a beam used by the terminal device for random access and random access information of the terminal device on the beam. The identifier of the beam may be an identifier of a synchronization signal block or an identifier of a channel state information reference signal.

Optionally, the terminal device may further include an obtaining module 701, configured to receive a random access channel optimization result or information from the radio access network device.

Optionally, the first information may further include a measurement result of the beam, and the measurement result of the beam includes any one or more of the following: an identifier of a cell in which the synchronization signal block is located, a frequency of the synchronization signal block, a signal to interference plus noise ratio of the synchronization signal block, reference signal received power of the synchronization signal block, reference signal received quality of the synchronization signal block, an identifier of a cell in which the channel state information reference signal is located, a frequency of the channel state information reference signal, a signal to interference plus noise ratio of the channel state information reference signal, reference signal received power of the channel state information reference signal, and reference signal received quality of the channel state information reference signal.

Optionally, the first information may further include an identifier of an uplink carrier used by the terminal device for the random access and random access information of the terminal device on the uplink carrier. The identifier of the uplink carrier may be an identifier of a normal uplink carrier or an identifier of a supplementary uplink carrier.

Optionally, the first information may further include a measurement result of the uplink carrier, and the measurement result of the uplink carrier includes any one or more of the following: an identifier of a cell in which the normal uplink carrier is located, a frequency of the normal uplink carrier, a signal to interference plus noise ratio of the normal uplink carrier, reference signal received power of the normal uplink carrier, reference signal received quality of the normal uplink carrier, an identifier of a cell in which the supplementary uplink carrier is located, a frequency of the supplementary uplink carrier, a signal to interference plus noise ratio of the supplementary uplink carrier, reference signal received power of the supplementary uplink carrier, and reference signal received quality of the supplementary uplink carrier.

For example, the random access information may include any one or more of the following: a quantity of preamble attempt times, preamble information used in a preamble attempt, conflict indication information, load information of the random access channel, load information of a physical uplink shared channel, maximum power arrival indication information, failure duration information, access delay information, path loss estimation information, backoff time information, information about data available for transmission, and a random access type.

Figure 8:
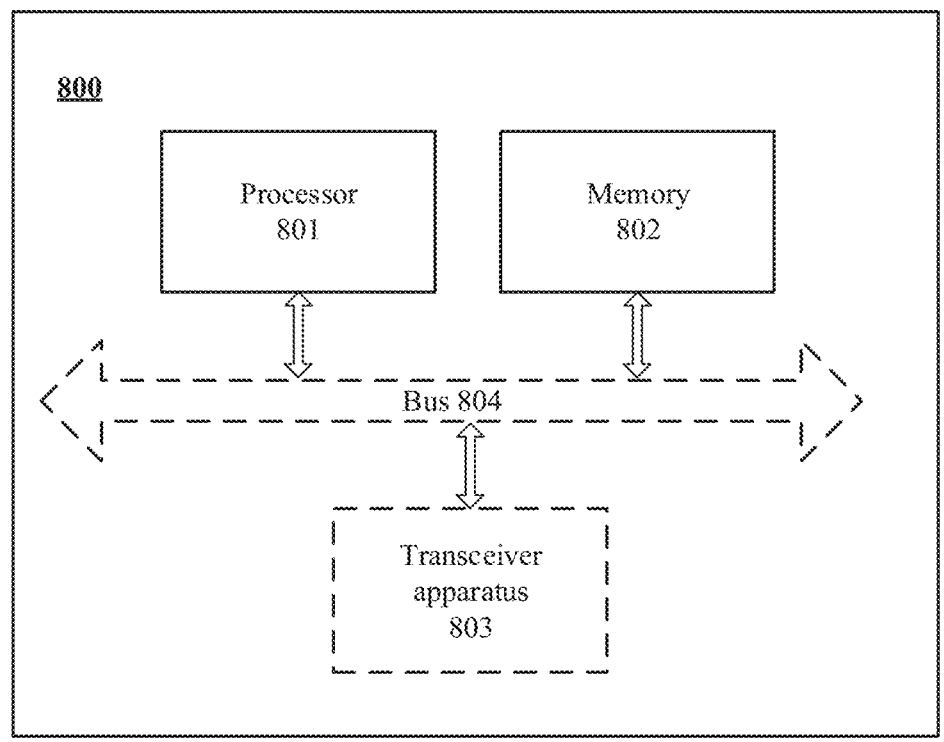
FIG. 8 is a schematic block diagram of a communications apparatus according to an embodiment of this application.

Based on a same technical concept, an embodiment of this application further provides a communications apparatus, which may be configured to implement a function performed by any terminal device or any radio access network device in the foregoing method embodiments. The following specifically describes a structure and a function of a communications apparatus 800 with reference to FIG. 8 in the embodiments of this application. FIG. 8 is a schematic block diagram of the communications apparatus 800 according to an embodiment of this application. The communications apparatus may include at least one processor 801. When a program instruction is executed by the at least one processor 801, a function of the terminal device or the radio access network device in any design in the communication methods/systems provided in the methods 200 to 500 is implemented. Optionally, the communications apparatus 800 may further include at least one memory 802, and the memory 802 may be configured to store a required program instruction and/or required data. For brevity, details are not described herein. Optionally, the communications apparatus 800 may further include a transceiver apparatus 803. The transceiver apparatus 803 may be configured to perform communication interaction between the communications apparatus 800 and another communications device (for example, a radio access network device or a terminal device, which is not limited herein), for example, exchange control signaling and/or service data. The transceiver apparatus 803 may be implemented by using a circuit having a communication transceiver function. Optionally, as shown in FIG. 8, the communications apparatus 800 may further include a bus 804, and components in the communications apparatus 800 may be interconnected by using the bus 804.

Figure 9:
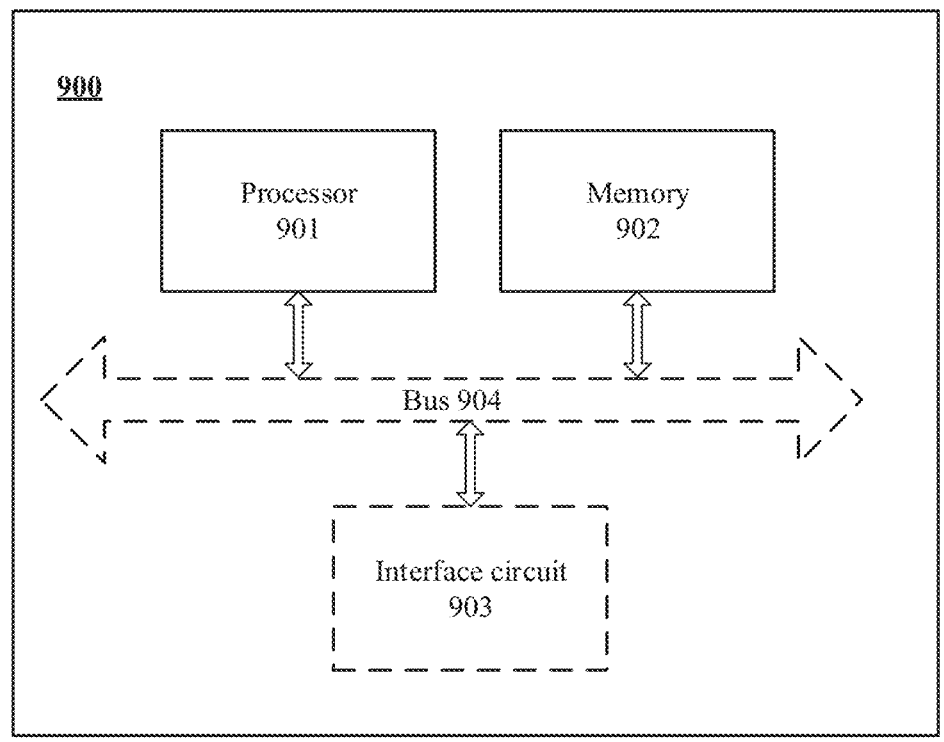
FIG. 9 is a schematic block diagram of a system chip according to an embodiment of this application.

An embodiment of this application provides a system chip 900. The following specifically describes a structure and a function of the system chip 900 with reference to FIG. 9 in the embodiments of this application. FIG. 9 is a schematic block diagram of the system chip 900 according to an embodiment of this application. The system chip 900 may be applied to the foregoing terminal device or radio access network device. Through processing by using the system chip, the terminal device or the radio access network device can perform an operation of the terminal device or the radio access network device in any possible design solution in the communication methods/systems provided in the methods 200 to 500 in the embodiments of this application. As shown in FIG. 9, the system chip 900 may include at least one processor 901. When a program instruction is executed by the at least one processor 901, an operation of the terminal device or the radio access network device in any design solution in the communication methods/systems provided in the methods 200 to 500 in the embodiments of this application is implemented. Optionally, the system chip 900 may further include at least one memory 902, and the memory 902 stores the related program instruction. Optionally, the system chip 900 may further include an interface circuit 903 and a bus 904. The at least one processor 901, the at least one memory 902, and the interface circuit 903 are coupled by using the bus 904. The system chip 900 interacts with a terminal device or a radio access network device/another device in a network through the interface circuit 903. Optionally, the processor 901 and the memory 902 may be integrated into one processing apparatus. For example, during specific implementation, the memory 902 may be integrated into the processor 901, or may be independent of the processor 901.

A person skilled in the art may clearly understand that, for the purpose of convenient and brief description, division into the foregoing function modules is merely used as an example for description. In an actual application, the foregoing functions may be allocated to different function modules for implementation based on a requirement. That is, an inner structure of an apparatus is divided into different function modules to implement all or some of the functions described above. For a detailed working process of the foregoing system, apparatus, and unit, refer to a corresponding process in the foregoing method embodiments, and details are not described herein again.

In the embodiments in this application, it should be understood that the disclosed system, apparatus, and method may be implemented in other manners. For example, the described apparatus embodiments are merely examples. For example, division into the modules or units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

It should be understood that, the processor in the embodiments of this application may be a central processing unit (CPU), or the processor may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It may be further understood that the memory in the embodiments of this application may be a volatile memory or a non-volatile memory, or may include a volatile memory and a non-volatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), and is used as an external cache. Through example but not limitative description, many forms of random access memories (random access memory, RAM) may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on a particular application and a design constraint condition of the technical solutions. A person skilled in the art may use different methods to implement the described functions for each particular application, but it should not be considered that the implementation goes beyond the scope of this application.

In the embodiments of this application, the units described as separate components may or may not be physically separate, and components displayed as units may or may not be physical units, may be located in one position, or may be distributed on a plurality of network units. Some or all of the units may be selected based on actual requirements to achieve the objectives of the solutions of the embodiments of this application.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software function unit and sold or used as an independent product, the integrated unit may be stored in a computer-readable storage medium. Based on such an understanding, the technical solutions of this application essentially, or the part contributing to the current technology, or all or some of the technical solutions may be implemented in a form of a software product. The computer software product is stored in a storage medium and includes several instructions for instructing a computer device (which may be a personal computer, a server, a radio access network device, or the like) or a processor to perform all or some of the operations of the methods in the embodiments of this application. The foregoing storage medium may include any medium or computer storage medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An apparatus, comprising:
at least one memory, configured to store program instructions; and
at least one processor, configured to execute the program instructions stored in the memory, to enable the apparatus to perform operations comprising:
receiving first information from a terminal device, wherein the first information comprises an identifier of a beam used by the terminal device for random access, wherein the first information further comprises random access information of the terminal device performing the random access, the random access information corresponding to the beam, wherein the first information is received from the terminal device in an uplink channel different from a random access channel (RACH), and
wherein the random access information comprises any one or more of: a quantity of preamble attempt times, preamble information used in a preamble attempt, conflict indication information, load information of the RACH, load information of a physical uplink shared channel, maximum power arrival indication information, failure duration information, access delay information, path loss estimation information, backoff time information, information about data available for transmission, or a random access type; and
performing random access channel optimization based on the first information.

2. The apparatus according to claim 1, wherein the identifier of the beam is an identifier of a synchronization signal block or an identifier of a channel state information reference signal.

3. The apparatus according to claim 1, wherein the first information further comprises a measurement result of the beam, and the measurement result of the beam comprises any one or more of following: an identifier of a cell in which a synchronization signal block is located, a frequency of the synchronization signal block, a signal to interference plus noise ratio of the synchronization signal block, reference signal received power of the synchronization signal block, reference signal received quality of the synchronization signal block, an identifier of a cell in which a channel state information reference signal is located, a frequency of the channel state information reference signal, a signal to interference plus noise ratio of the channel state information reference signal, reference signal received power of the channel state information reference signal, or reference signal received quality of the channel state information reference signal.

4. The apparatus according to claim 1, wherein performing the random access channel optimization based on the first information comprises any one or more of following:
optimizing a reference signal received power threshold of a synchronization signal block,
optimizing a reference signal received power threshold of a channel state information reference signal,
optimizing a reference signal received power threshold of a supplementary uplink carrier, or
optimizing a random access channel resource.

5. The apparatus according to claim 1, wherein the random access type includes at least one of a system information request, radio resource control (RRC) connection establishment, or beam failure recovery.

6. An apparatus, comprising:
at least one memory, configured to store program instructions; and
at least one processor, configured to execute the program instructions stored in the memory, to enable the apparatus to perform operations comprising:
sending first information to a radio access network device, wherein the first information comprises an identifier of a beam used by the apparatus for random access, wherein the first information further comprises random access information of the apparatus performing the random access, the random access information corresponding to the beam, wherein the first information is sent to the radio access network device in an uplink channel different from a random access channel (RACH), and
wherein the random access information comprises any one or more of: a quantity of preamble attempt times, preamble information used in a preamble attempt, conflict indication information, load information of the RACH, load information of a physical uplink shared channel, maximum power arrival indication information, failure duration information, access delay information, path loss estimation information, backoff time information, information about data available for transmission, or a random access type.

7. The apparatus according to claim 6, wherein the identifier of the beam is an identifier of a synchronization signal block or an identifier of a channel state information reference signal.

8. The apparatus according to claim 6, wherein the first information further comprises a measurement result of the beam, and the measurement result of the beam comprises any one or more of following: an identifier of a cell in which a synchronization signal block is located, a frequency of the synchronization signal block, a signal to interference plus noise ratio of the synchronization signal block, reference signal received power of the synchronization signal block, reference signal received quality of the synchronization signal block, an identifier of a cell in which a channel state information reference signal is located, a frequency of the channel state information reference signal, a signal to interference plus noise ratio of the channel state information reference signal, reference signal received power of the channel state information reference signal, or reference signal received quality of the channel state information reference signal.

9. The apparatus according to claim 6, wherein the random access type includes at least one of a system information request, radio resource control (RRC) connection establishment, or beam failure recovery.

10. The apparatus according to claim 6, wherein the operations further comprise:
receiving a random access channel optimization result or information from the radio access network device.

11. The apparatus according to claim 10, wherein the random access channel optimization result or information comprises any one or more of following: an adjusted reference signal received power threshold of a synchronization signal block, an adjusted reference signal received power threshold of a channel state information reference signal, an adjusted reference signal received power threshold of a supplementary uplink carrier, or an adjusted random access channel resource.

12. A method applied for a terminal device, comprising:
sending first information to a radio access network device, wherein the first information comprises an identifier of a beam for random access, wherein the first information further comprises random access information of the terminal device performing the random access, the random access information corresponding to the beam, wherein the first information is sent to the radio access network device in an uplink channel different from a random access channel (RACH), and
wherein the random access information comprises any one or more of: a quantity of preamble attempt times, preamble information used in a preamble attempt, conflict indication information, load information of the RACH, load information of a physical uplink shared channel, maximum power arrival indication information, failure duration information, access delay information, path loss estimation information, backoff time information, information about data available for transmission, or a random access type.

13. The method according to claim 12, wherein the identifier of the beam is an identifier of a synchronization signal block or an identifier of a channel state information reference signal.

14. The method according to claim 12, wherein the first information further comprises a measurement result of the beam, and the measurement result of the beam comprises any one or more of following: an identifier of a cell in which a synchronization signal block is located, a frequency of the synchronization signal block, a signal to interference plus noise ratio of the synchronization signal block, reference signal received power of the synchronization signal block, reference signal received quality of the synchronization signal block, an identifier of a cell in which a channel state information reference signal is located, a frequency of the channel state information reference signal, a signal to interference plus noise ratio of the channel state information reference signal, reference signal received power of the channel state information reference signal, or reference signal received quality of the channel state information reference signal.

15. The method according to claim 14, wherein the random access type includes at least one of a system information request, radio resource control (RRC) connection establishment, or beam failure recovery.

16. The method according to claim 12, further comprising:
receiving a random access channel optimization result or information from the radio access network device.

17. The method according to claim 16, wherein the random access channel optimization result or information comprises any one or more of following: an adjusted reference signal received power threshold of a synchronization signal block, an adjusted reference signal received power threshold of a channel state information reference signal, an adjusted reference signal received power threshold of a supplementary uplink carrier, or an adjusted random access channel resource.

18. The apparatus of claim 1, wherein the random access information comprises any one or more of: the quantity of preamble attempt times, the conflict indication information, or the random access type.

19. The apparatus of claim 6, the first information being for an optimization of the RACH.

20. The method of claim 12, the first information being for an optimization of the RACH.

* * * * *